US006912491B1

(12) United States Patent
Van Bemmel

(10) Patent No.: US 6,912,491 B1
(45) Date of Patent: Jun. 28, 2005

(54) METHOD AND APPARATUS FOR MAPPING UNCERTAINTY AND GENERATING A MAP OR A CUBE BASED ON CONDITIONAL SIMULATION OF RANDOM VARIABLES

(75) Inventor: Peter P. Van Bemmel, Houston, TX (US)

(73) Assignee: Schlumberger Technology Corp., Houston, TX (US)

( * ) Notice: Subject to any disclaimer, the term of this patent is extended or adjusted under 35 U.S.C. 154(b) by 0 days.

(21) Appl. No.: 09/520,259

(22) Filed: Mar. 7, 2000

Related U.S. Application Data

(60) Provisional application No. 60/135,904, filed on May 25, 1999.

(51) Int. Cl.⁷ .............................................. G06F 17/10
(52) U.S. Cl. ............................. 703/2; 703/10; 702/14; 367/73
(58) Field of Search ........................ 703/2, 10; 702/14; 367/73

(56) References Cited

U.S. PATENT DOCUMENTS

| | | | |
|---|---|---|---|
| 5,416,750 A | | 5/1995 | Doyen et al. |
| 5,563,949 A | | 10/1996 | Bahorich et al. |
| 5,729,451 A | | 3/1998 | Gibbs et al. |
| 5,838,634 A | * | 11/1998 | Jones et al. .................... 367/73 |
| 5,884,229 A | * | 3/1999 | Matteucci .................... 702/14 |
| 5,995,907 A | | 11/1999 | Van Bemmel et al. |
| 6,067,340 A | | 5/2000 | Eppstein et al. |
| 6,081,577 A | * | 6/2000 | Webber ........................ 378/23 |

OTHER PUBLICATIONS

The Computer Science and Engineering Handbook, by Allen B. Tucker, CRC Press, ISBN: 0–8493–2904–4, 1996, Plate 35.8 and p. 1520.*

Probability and Statistical Inference by Hogg et al., Third Edition 1988, ISBN 0–02–355810–5, p. 613 Table IV The Normal Distribution. Also see Section 6.4 Confidence Intervals for Means p. 348–356.*

(Continued)

Primary Examiner—Kevin J. Teska
Assistant Examiner—Ed Garcia-Otero
(74) Attorney, Agent, or Firm—John Bouchard; Danita Maseles

(57) ABSTRACT

A new method is presented for generating a probability map, a cutoff map, and a confidence limit map in one single operation. In addition, the new method can also generate a cube representing a cubic volume of earth formation by using the same method for generating the aforementioned maps. This is accomplished by:

(a) gridding a cross section, (b) Kriging the gridded cross section thereby producing a plurality of expected values and a corresponding plurality of standard deviations associated, respectively, with the plurality of intersections on the gridded cross section, (c) generating a plurality of probability density functions which correspond, respectively, to the plurality of expected values/standard deviations of the plurality of intersections, (d) integrating each of the probability density functions thereby generating a plurality of cumulative distribution functions which correspond, respectively, to the plurality of probability density functions, (e) choosing a value from each of the cumulative distribution functions associated with each of the intersections of the gridded cross section, and (f) assigning such value to its associated intersection of the gridded cross section and assigning a unique color to each such value, thereby generating a map illustrating the characteristics of the cross section through the earth formation. Since a cube includes a plurality of gridded cross sections, by generating a map for each cross section, the new method will generate the cube.

56 Claims, 22 Drawing Sheets

OTHER PUBLICATIONS

A brochure entitled "Variance Cube"—5 pages—Jul. 1999.
Brochure entitled "Variance Cube"—5 pages, Jul. 1999.
The Computer Science and Engineering Handbook, Allen B. Tucker, CRC Press, ISBN: 0–8493–2909–4, 1996, Plate 35.8, p. 1520.
"Probability and Statistical Inference," Hogg, et al., Third Edition 1988, ISBN 0–02–355810–5, p. 613, Table IV, The Normal Distribution. Also see section 6.4 Confidence Intervals for Means, pp. 348–356.
Integrating Geophysical Data For Mapping The Contamination of Industrial Sites By Polycyclic Aromatic Hydrocarbonds: A Geostatistical Approach. Colin P., et al., ASTM Special Technical Publication No. 1283, Oct. 1996, pp. 69–87.

* cited by examiner

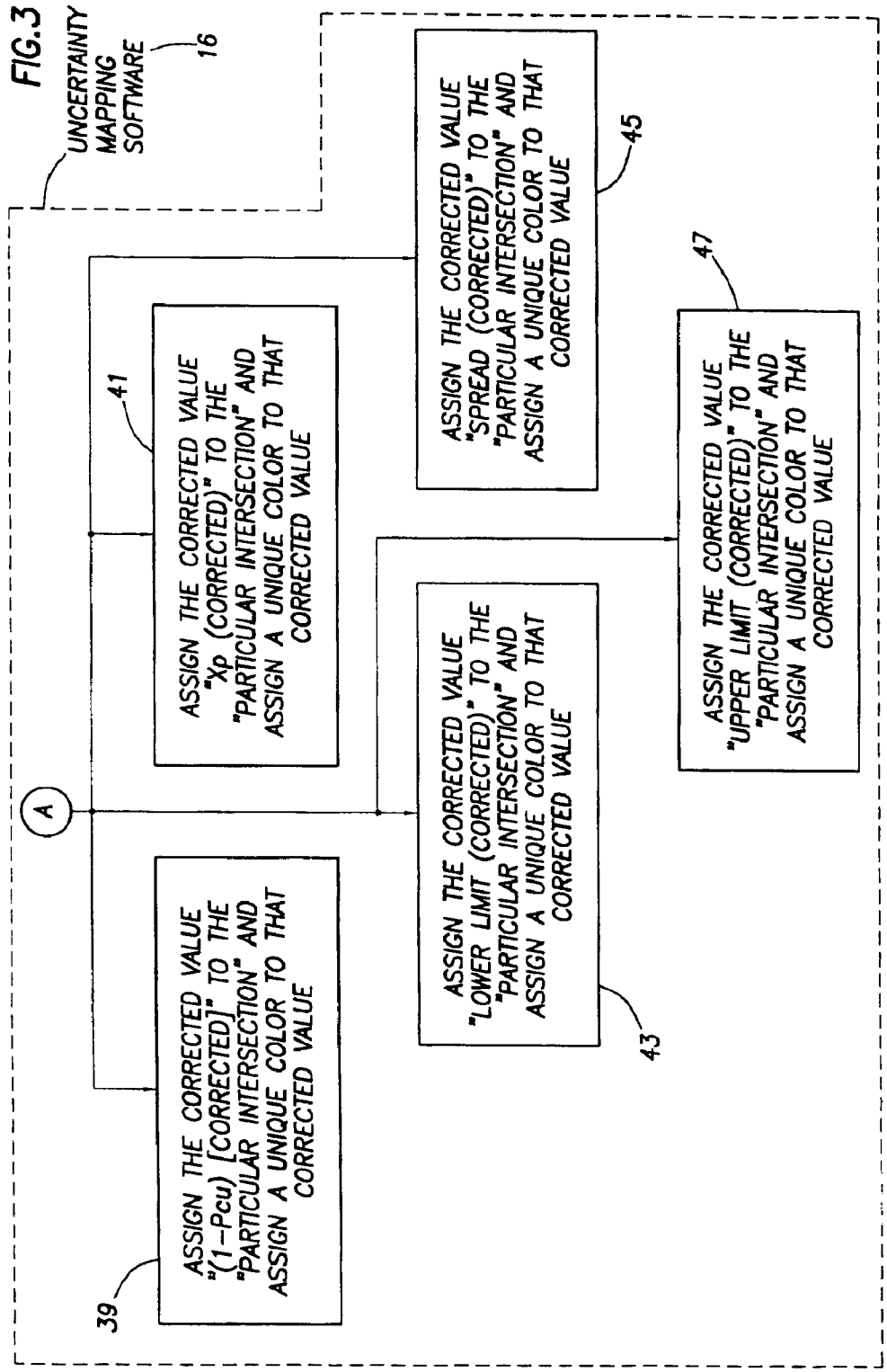

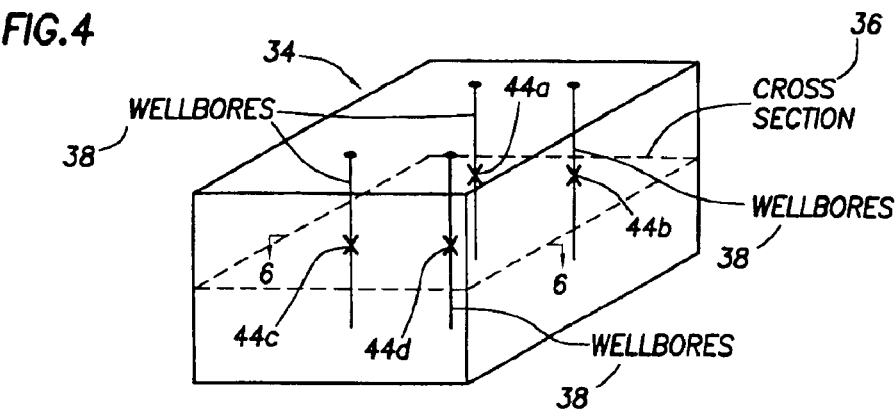
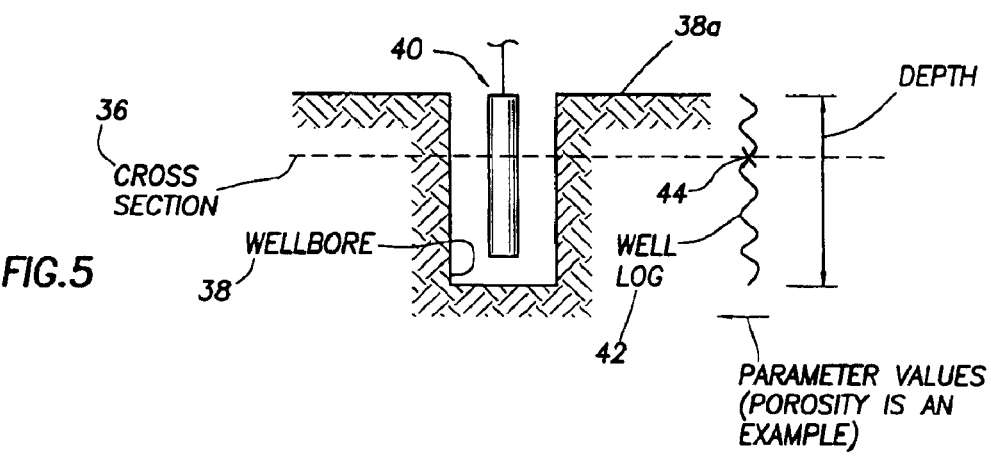
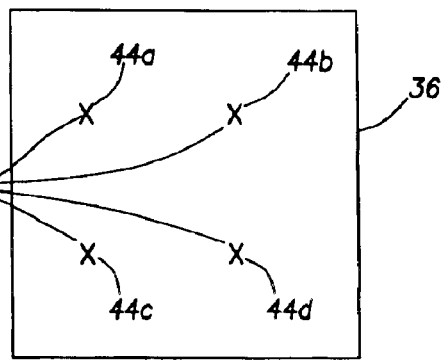

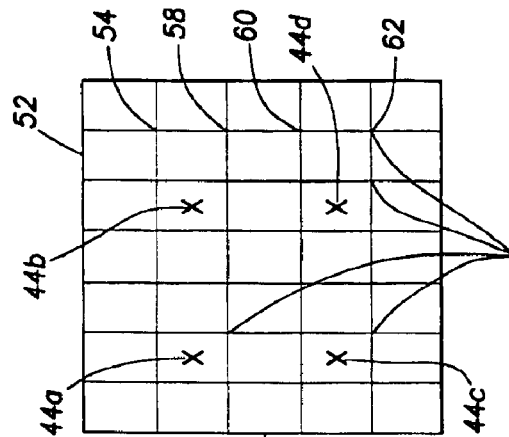
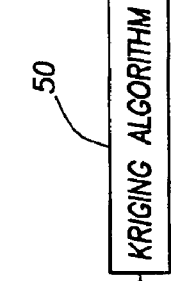
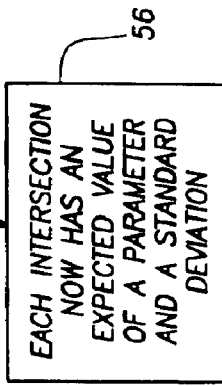
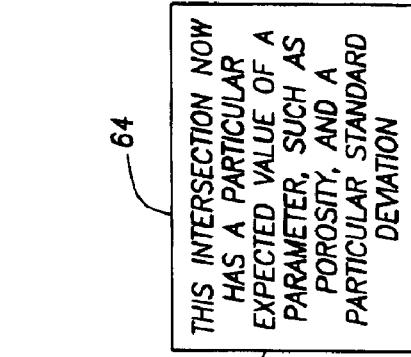
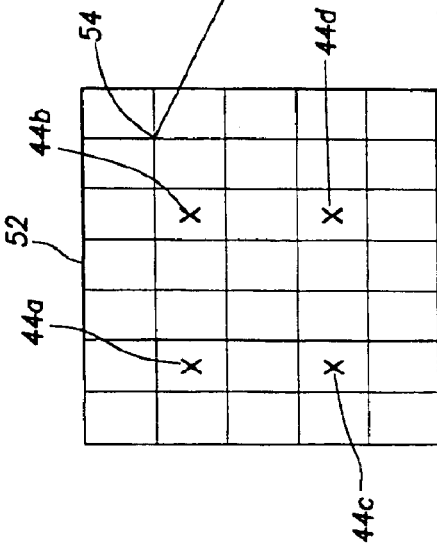

FIG. 12 INTEGRATE THE PROBABILITY DENSITY FUNCTION (PDF) TO GET THE CUMULATIVE DISTRIBUTION FUNCTION (CDF) ⟵ 66

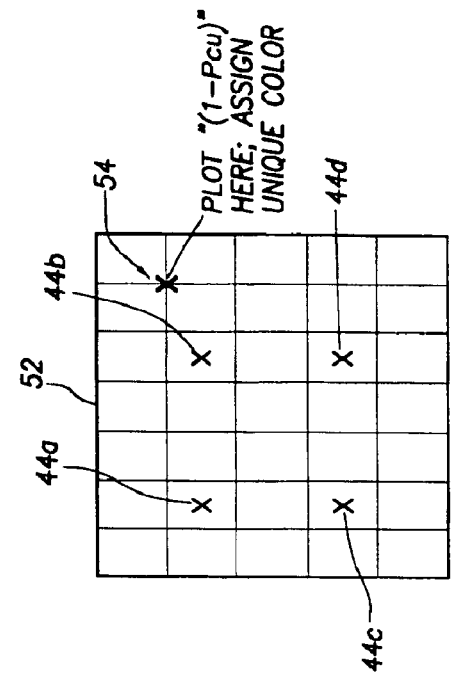
FIG. 13
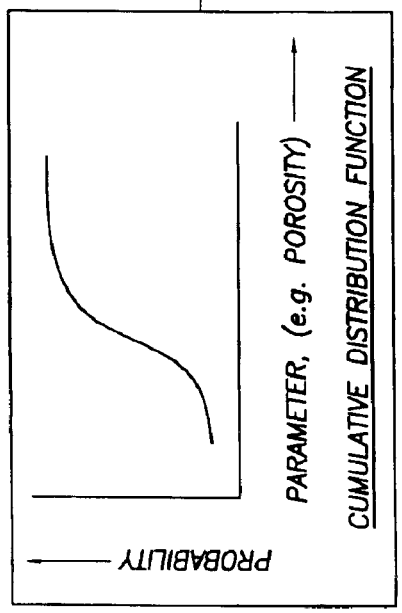
FIG. 14
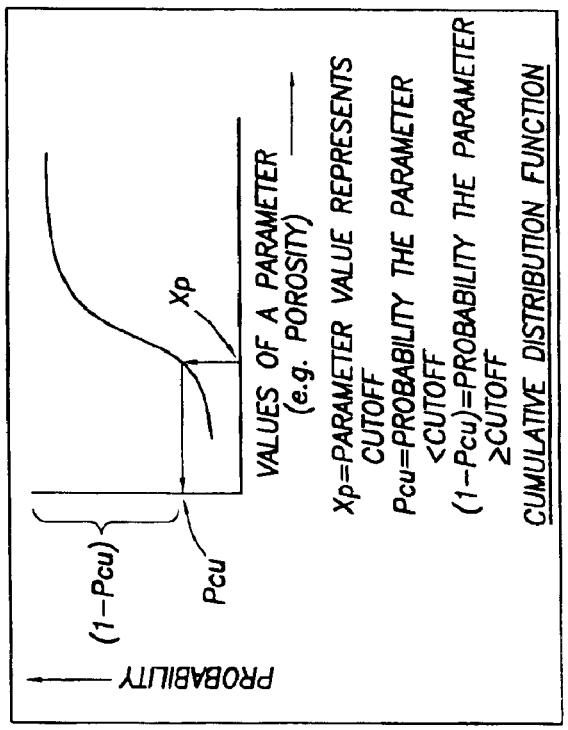
FIG. 15
FIG. 16

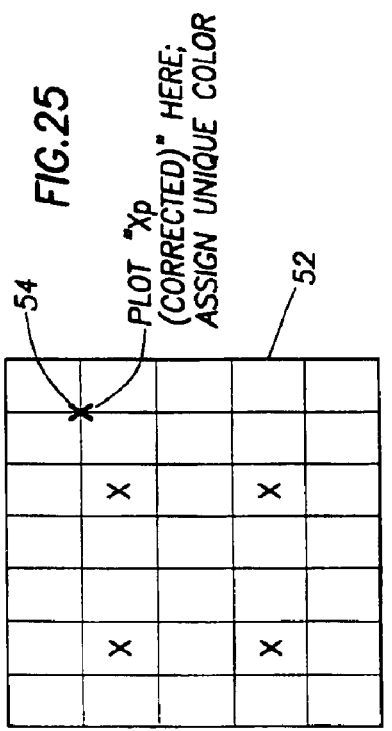
FIG.24 PLOT "(1−Pcu) [CORRECTED]" HERE; ASSIGN UNIQUE COLOR
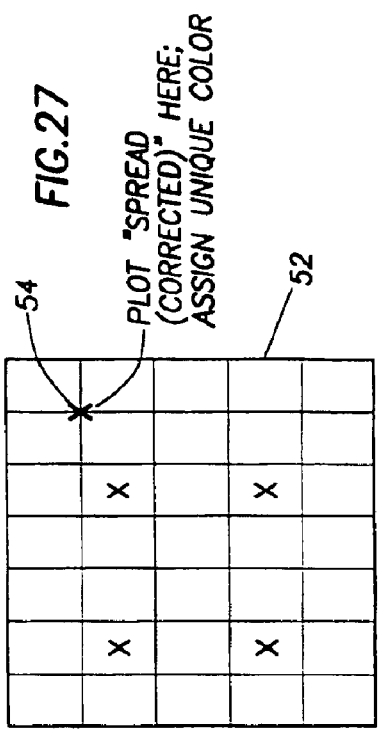
FIG.25 PLOT "Xp (CORRECTED)" HERE; ASSIGN UNIQUE COLOR
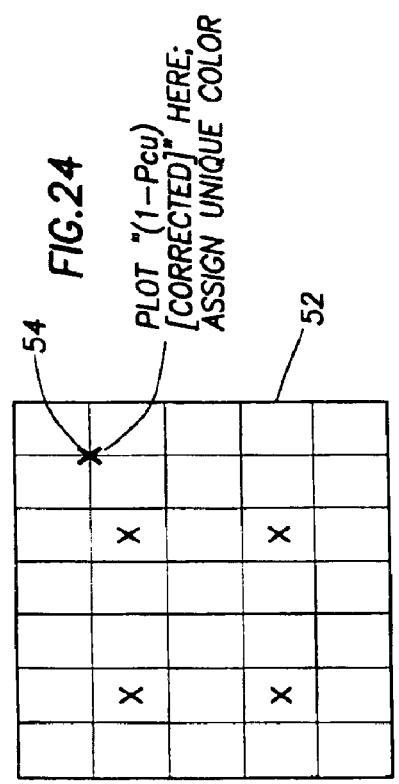
FIG.26 PLOT "LOWER LIMIT (CORRECTED)" HERE; ASSIGN UNIQUE COLOR
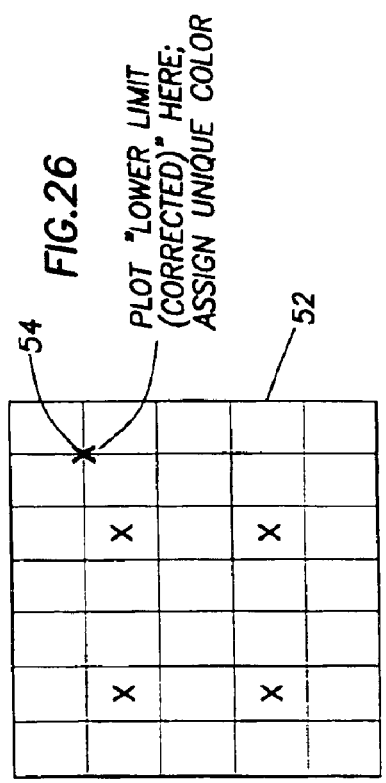
FIG.27 PLOT "SPREAD (CORRECTED)" HERE; ASSIGN UNIQUE COLOR FIG.33
| FIG.33a | FIG.33b |
| FIG.33c | FIG.33d |
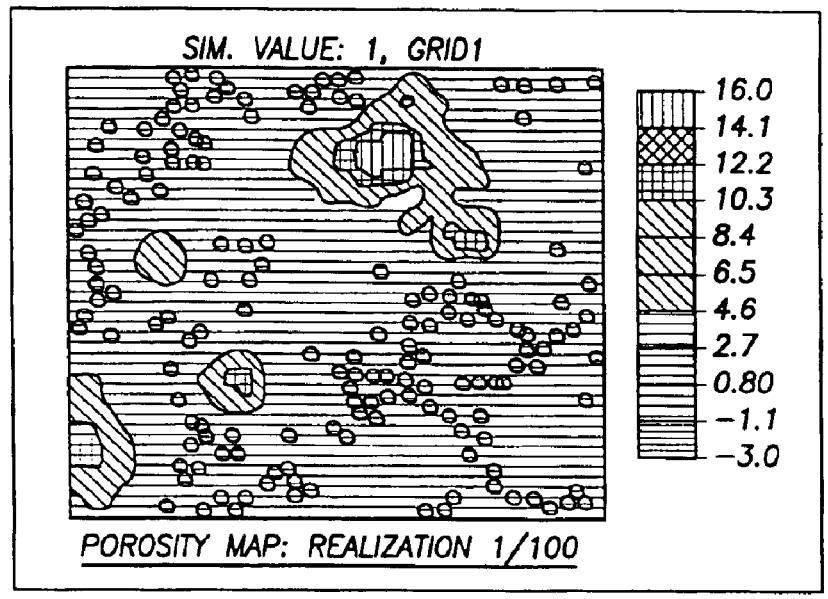
FIG.33a
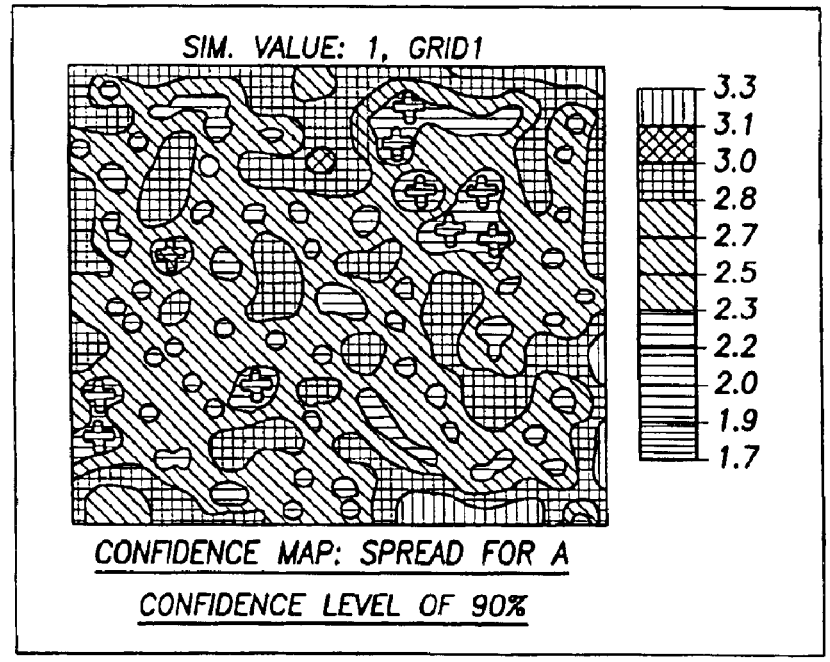
FIG.33b FIG.34
| FIG.34a | FIG.34b |
|---------|---------|
| FIG.34c | FIG.34d |
FIG.34a
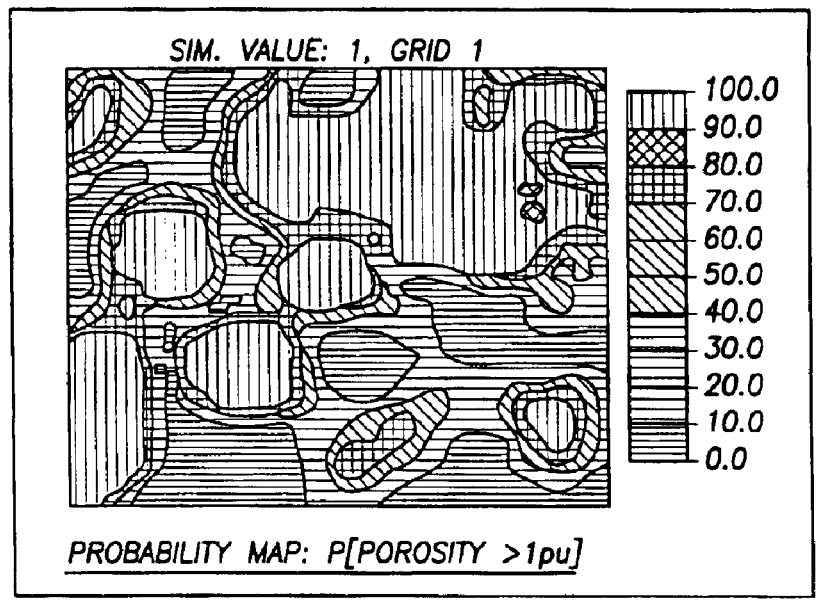
FIG.34b
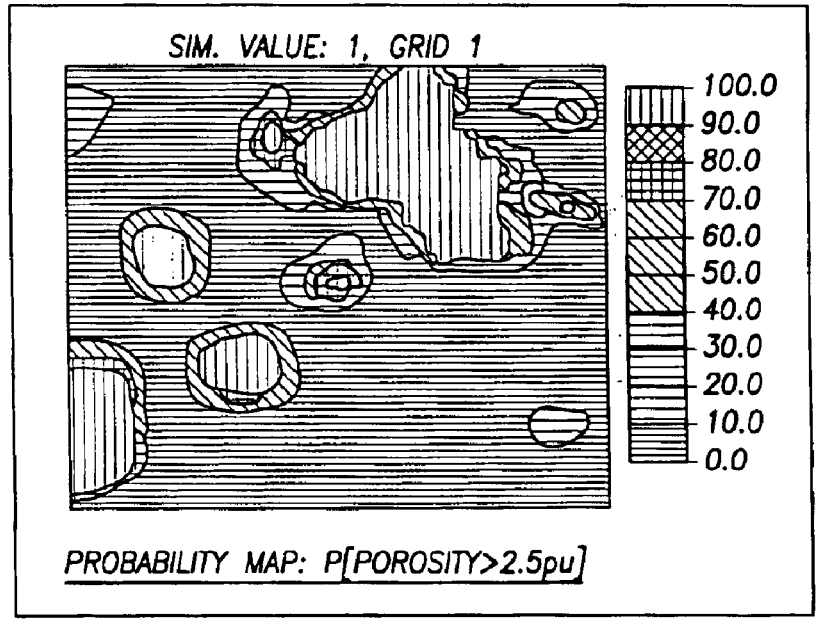

FIG.35
| FIG.35a | FIG.35b |
| FIG.35c | FIG.35d |
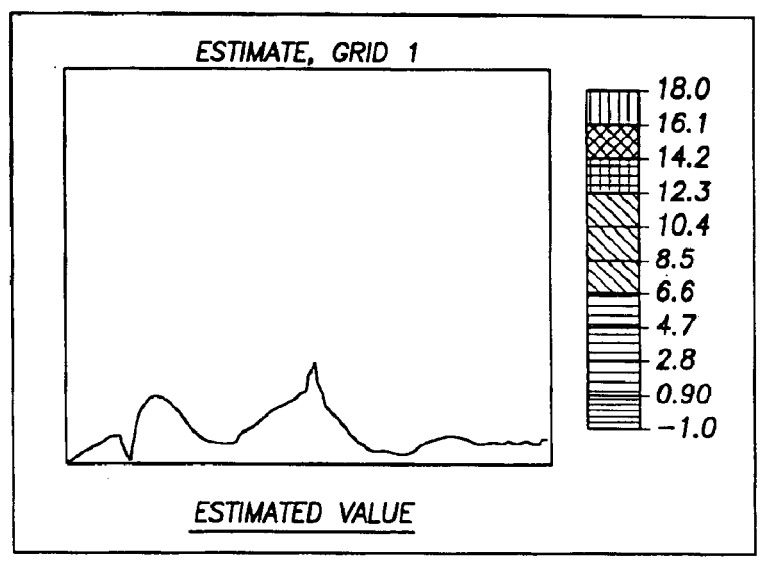
FIG.35a
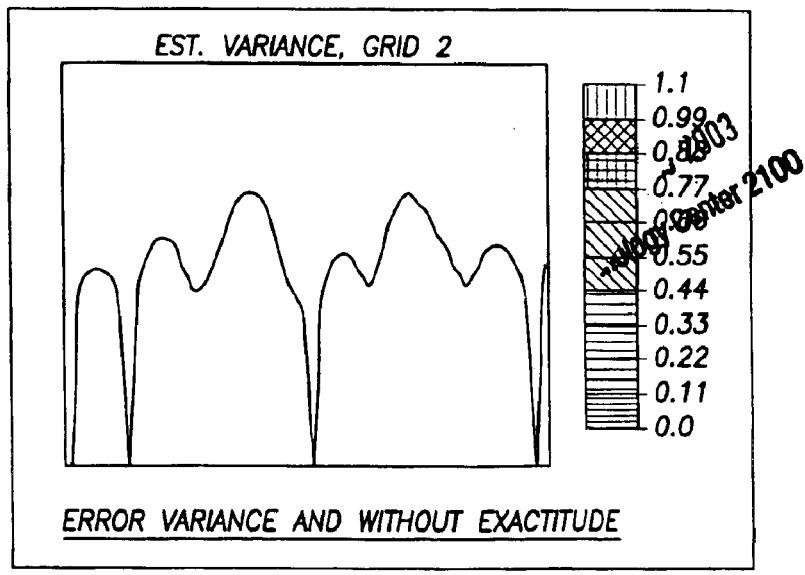
FIG.35b

METHOD AND APPARATUS FOR MAPPING UNCERTAINTY AND GENERATING A MAP OR A CUBE BASED ON CONDITIONAL SIMULATION OF RANDOM VARIABLES

CROSS REFERENCE TO RELATED APPLICATIONS

This application is a Utility application of prior pending provisional application Ser. No. 60/135,904, filed May 25, 1999, and entitled "Uncertainty Mapping".

BACKGROUND OF THE INVENTION

The subject matter of the present invention relates to a software based method and associated apparatus for mapping uncertainty by producing one or more "maps", such as a probability map or a cutoff map or a confidence limit map, and or one or more cubes, based on the conditional simulation of a set of random variables.

The estimation at any spatial location (x, y, z) of the value of a parameter (i.e., a random variable), such as porosity or permeability, from a set of scattered observations of data representing such a parameter may be achieved by a method known as "Kriging". For a reference which describes "Kriging", refer to either of the following two references: (1) Journe, A. G. "Fundamentals of Geostatistics in Five Lessons", Short course in Geology, vol 8, 44 pp, AGU, Washington, D.C. 1989, or (2) Deutsch, Clayton V. and Andre Journel, "GSLIB Geostatistical Software Library and User's Guide second edition", Oxford University Press, New York, Oxford, 1998; the disclosures in each of the above two references which discuss "Kriging" are incorporated by reference into this specification. For example, if a set of scattered data samples represents porosity (obtained, for example, by mapping a cross section of an earth formation through which a plurality of wellbores are drilled as indicated in FIGS. 4 and 5), when the cross section is gridded, the "Kriging" method can determine, at each intersection of the grid, the expected (mean) value of porosity and its standard deviation.

The result of estimating this value at a regular grid results in a smooth surface of the expected value generally following the data (see FIGS. 4 through 16). If the principle of exactitude is applied, this surface will actually go through the data if the data falls on a grid location. The error variance is also calculated at each grid location. At the data locations, this error variance equals zero unless the observation error variance is included in the calculation, in which case, this is the error variance at the data locations.

It is common practice to render a more realistic estimate of the variable by randomizing the answer using the estimated error variance. This is called a 'conditional simulation' because it is conditioned by the data and produces one out of any number of possible realizations. It is then customary to assess the risk associated with exploitation of the estimated accumulation of ore, hydrocarbons or other valuable commodities by sampling a good many of the realizations and ranking them in low, medium, and high ranges, according to the economic value of the estimated deposits. This is a lengthy and costly procedure.

Therefore, a new method of mapping uncertainty is needed.

A method of mapping an earth formation has been disclosed in U.S. Pat. Nos. 5,563,949 and 5,995,907. Another method for mapping an earth formation and generating a cube which contains a plurality of such maps is disclosed in prior pending application Ser. No. 09/377,573, filed Aug. 19, 1999, and entitled "Seismic signal processing method and apparatus for generating a cube of variance values".

SUMMARY OF THE INVENTION

Accordingly, it is a primary object of the present invention to provide a new method for mapping uncertainty, the new method being based on the conditional simulation of random variables.

In accordance with the above object of the present invention, it is a primary feature of the present invention to generate one or more maps representing the characteristics at each intersection of a gridded cross-section, where the gridded cross-section represents a time slice or a horizon through an earth formation, in response to a plurality of scattered data samples on such cross-section, where the data samples represent a plurality of parameters located at a plurality of random locations on the cross section, by performing the steps of: (a) obtaining a unique cumulative distribution function associated with each intersection of the gridded cross-section in the earth formation, (b) choosing a value from each of the cumulative distribution functions at each of the intersections of the gridded cross section, and (c) assigning such value to its respective intersection of the gridded cross section and assigning a unique color to each such value, thereby generating a map illustrating the characteristics of the cross section through the earth formation.

It is a further feature of the present invention to utilize the above referenced method for generating one or more maps to also generate a cube, the cube including a plurality of such maps which illustrate a set of characteristics associated with a plurality of cross sections through an earth formation.

It is a further feature of the present invention to obtain the unique cumulative distribution function associated with each intersection of the gridded cross-section by first obtaining a unique probability density function associated each such intersection, and then obtaining the unique cumulative distribution function from the probability density function associated with each intersection of the gridded cross section through the earth formation.

It is a further feature of the present invention to generate one or more maps representing the characteristics at each intersection of a gridded cross section representing a time slice or a horizon in an earth formation in response to a plurality of scattered data samples which represent a plurality of parameters located at a plurality of random locations on said cross section by performing the steps of:

(a) gridding the cross section thereby creating a plurality of intersections on said cross section, (b) Kriging the gridded cross section thereby producing a plurality of expected (mean) values of the parameter and a corresponding plurality of standard deviations associated, respectively, with the plurality of intersections on the gridded cross section in response to the plurality of scattered data samples, (c) generating a plurality of probability density functions corresponding, respectively, to the plurality of expected values and standard deviations which are associated, respectively, with the plurality of intersections of the gridded cross section, a unique probability density function being associated with each intersection of the gridded cross section, (d) integrating each of the probability density functions at each of the intersections of the gridded cross section to generate a plurality of cumulative distribution functions associated, respectively, with the plurality of intersections, a unique cumulative distribution function being associated with each intersection of the gridded cross section, (e) choosing a value from each of the cumulative distribution functions at each of the intersections of the gridded cross section, and (f) assigning such value to its associated intersection of the gridded cross section and assigning a unique color to each such value, thereby generating a map illustrating the characteristics of the cross section (which could represent a time slice or a horizon) through the earth formation.

It is a further feature of the present invention to generate one or more maps representing the characteristics at each intersection of a cross-section in an earth formation in response to a plurality of scattered data samples, wherein the choosing step (e) for choosing a value from each of the cumulative distribution functions (CDF) at each of the intersections of the gridded cross section comprises the step of selecting a cutoff value of a parameter on the x-axis of a CDF and choosing the associated value (Pcu) on the y-axis of the CDF, one minus such value [(1−Pcu)] representing the probability that the parameter is greater than the cutoff.

It is a further feature of the present invention to generate one or more maps representing the characteristics at each intersection of a cross-section in an earth formation in response to a plurality of scattered data samples, wherein the choosing step (e) for choosing a value from each of the cumulative distribution functions (CDF) at each of the intersections of the gridded cross section comprises the step of selecting a value of probability on the y-axis of the CDF and choosing its associated value "Xp" of a parameter on the x-axis of the CDF.

It is a further feature of the present invention to generate one or more maps representing the characteristics at each intersection of a cross-section in an earth formation in response to a plurality of scattered data samples, wherein the choosing step (e) for choosing a value from each of the cumulative distribution functions (CDF) at each of the intersections of the gridded cross section comprises the step of selecting a confidence range (e.g., 90%) on the y-axis of the CDF and choosing one of three values on the x-axis of the CDF: a lower limit, a spread, and an upper limit of such parameter on the x-axis of the CDF.

It is a further feature of the present invention to generate one or more maps representing the characteristics at each intersection of a cross-section in an earth formation in response to a plurality of scattered data samples, wherein the value selected via the choosing step (e) undergoes an affine correction, the value assigned to its associated intersection of the gridded cross section via the assigning step (f) being a "corrected value" which underwent a correction via the affine correction.

It is a further feature of the present invention to generate a cube representing a cubic volume through an earth formation which includes a plurality of gridded cross sections, where each gridded cross section includes a plurality of intersections, by performing the step of assigning the aforementioned "corrected value" to each intersection of each gridded cross section through a cubic volume of the earth formation.

In accordance with this object and other objects and features of the present invention, a new method is presented to produce probability, cutoff, confidence limit and connectivity maps in one single operation. In addition, the new method also produces a cube containing a plurality of said maps, where each of the maps in the cube may represent the probability map, the cutoff map, or the confidence limit map. This is accomplished by using the estimated gaussian distribution at each intersection of the grid given by an expected value and an error variance. For computations on non-gaussian problems, the data may be converted to gaussian by using the normal score transform [refer to the following reference: Deutsch, Clayton V. and Andre Journel, "GSLIB Geostatistical Software Library and User's Guide second edition", Oxford University Press, New York, Oxford, 1998, page 141, the disclosure of which is incorporated by reference into this specification]. The answers may be converted back to the prior distribution by a back transform.

More particularly, given a cross section through an earth formation, which cross section could represent a time slice or horizon in the earth formation, when a plurality of the random variables or parameters are associated with the cross section (for example, porosity or permeability), one or more maps can be generated, where each map illustrates a set of characteristics of that cross section, and a cube can also be generated, where the cube includes a plurality of such maps corresponding to a plurality of the cross sections through the earth formation. This can be accomplished by: (1) gridding the cross section thereby producing a gridded cross section including the plurality of associated random variables, the gridded cross section including a plurality of intersections, (2) using the random variables or parameters (such as porosity) on the cross section, obtaining a corresponding plurality of parameters at each of the intersections of the gridded cross section by "Kriging" the plurality of random variables on the gridded cross section, the plurality of parameters at each intersection of the gridded cross section including a unique expected value of the parameter (i.e., the mean value) and a unique standard deviation, the unique expected value and the unique standard deviation at each intersection of the gridded cross section corresponding to a unique probability density function at each intersection, (3) integrating the probability density function at each intersection of the gridded cross section to obtain a unique cumulative distribution function at each intersection of the gridded cross section, (4) from the unique cumulative distribution function at each intersection of the gridded cross section, obtaining a value from that cumulative distribution function, a plurality of values being obtained which are associated, respectively, with the plurality of intersections of the gridded cross section, (5) correcting the plurality of values obtained from the corresponding plurality of cumulative distribution functions and associated, respectively, with the plurality of intersections by using an "affine correction" thereby producing a plurality of 'corrected values' corresponding, respectively, to the plurality of intersections of the gridded cross section, and (6) assigning each of the 'corrected values' to a particular intersection of the gridded cross section, and assigning a unique color to each such corrected value.

The above step (4), for obtaining a value from the cumulative distribution function, would include: (4a) selecting a cutoff on the x-axis of the cumulative distribution function and determining a probability "Pcu" on the y-axis, (1−Pcu) being the 'value' which represents the probability that the parameter is greater than the cutoff, or (4b) selecting a probability on the y-axis of the cumulative distribution function and determining a cutoff "Xp" on the x-axis of the cumulative distribution function, "Xp" being the 'value' which represents a cutoff, or (4c) selecting a confidence limit range on the y-axis of the cumulative distribution function, and choosing three values from the x-axis of the cumulative distribution function: the "lower limit", the "spread", and the "upper limit".

A lower cutoff map is generated by plugging in the desired probability and measuring the quantity via the local cumulative distribution function (cdf). In this manner, we produce a map of lower cutoff values for the desired probability. We can then say that, at any given (x, y, z) location, the content is at least the cutoff value with a probability of, for example, ninety percent. A lower cutoff cube can be generated from a plurality of the lower cutoff maps. A probability map is generated by plugging in the desired lower cutoff and evaluating the probability at any (x, y, z) location, again using the gaussian cumulative distribution function (cdf). A probability cube can be generated from a plurality of the probability maps. Confidence limit maps are obtained by plugging in half the compliment of the confidence level and one minus this measure to the lower and upper limit of the cumulative distribution function (cdf). The difference between those limits is the data range for the given confidence level. For example, a confidence level of 90% would correspond to 0.05 and 0.95 on the cdf. A confidence limit cube can also be generated from a plurality of the confidence limit maps. To compensate for the smoothing effect of randomizing within the estimated error variance, an affine correction is applied. This is accomplished by cogenerating one realization without feeding the newly estimated nodes back into the simulation. The mean and the standard deviation of this realization are then calculated and compared with the mean and the standard deviation of the data. The correction ensures that the resulting maps are derived from the same global mean and standard deviation as the original data. A connectivity map may be produced from a permeability cutoff map for a given probability by superimposing an arbitrary bound above which the formation is said to be permeable and below which it is impermeable. We may use indicators such as a "one" to denote permeability and a "zero" to denote impermeability. In this fashion, a reservoir may be divided into several unconnected compartments, which will influence the economics of the extraction of hydrocarbons. Permeability cutoff maps may be submitted to a fluid flow simulator to estimate the minimum production for a given acceptable probability or risk. It should be remembered, however, that, although this is a lower cutoff surface, it is smooth and does not represent the natural irregularities we expect in the reservoir.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 2 and 3 illustrates a flowchart used for discussion of the production of the Probability maps by the uncertainty mapping software of FIG. 1;

FIGS. 4 through 16 illustrates several figures which are used during the discussion of the production of the Probability maps by the uncertainty mapping software of FIG. 1;

FIGS. 24 through 28 illustrate the corrected values of (1−Pcu), Xp, lower limit, spread, and upper limit, corrected by the affine correction, which are assigned to and plotted on a gridded cross section through an earth formation;

FIGS. 36 through 43 illustrate how a cube is generated given the methods discussed with reference to FIGS. 1 through 35 for determining a 'corrected value' to assign to each intersection of a gridded cross section.

DESCRIPTION OF THE PREFERRED EMBODIMENT

Figure 1:
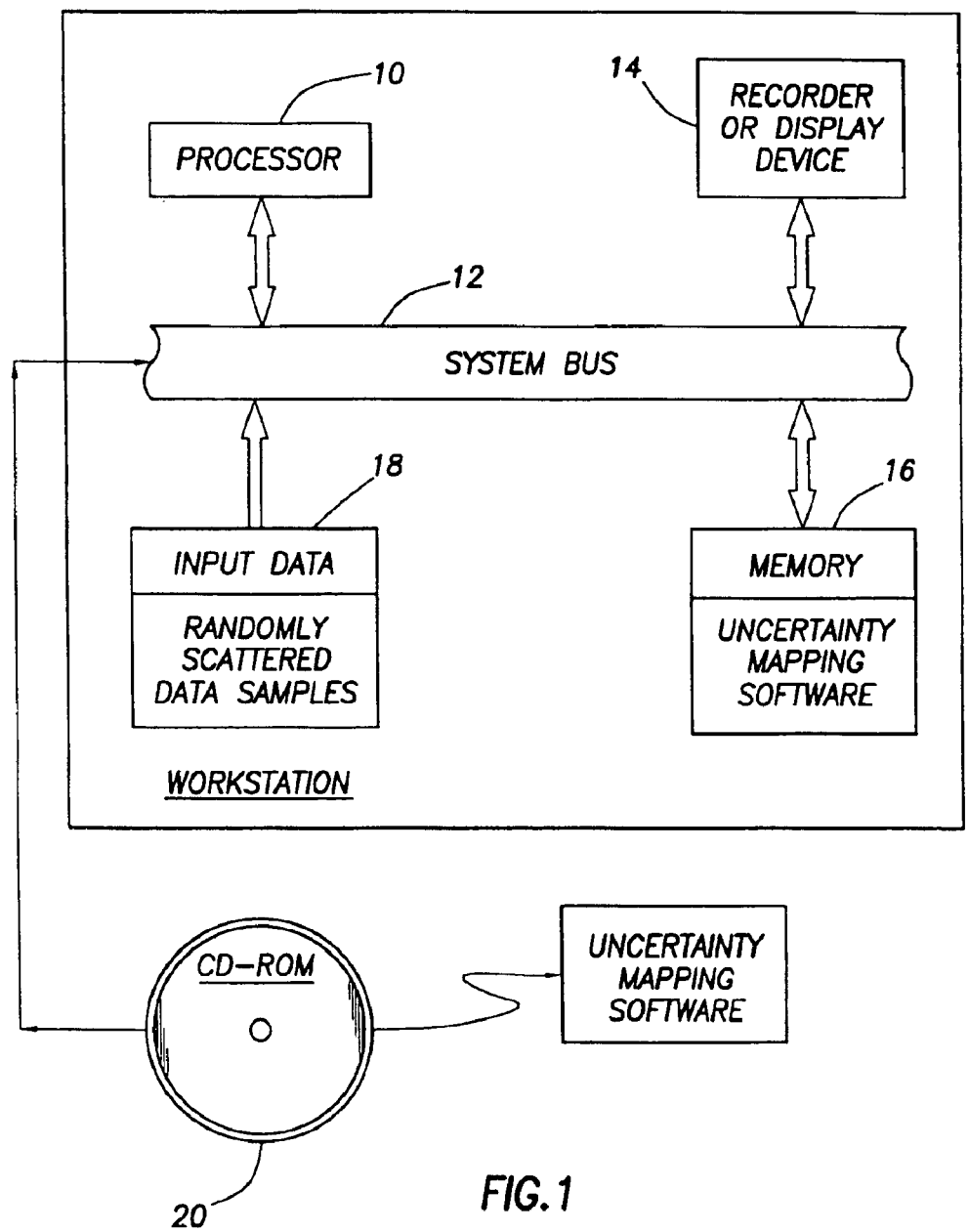
FIG. 1 illustrates a workstation or other computer system which stores a novel "uncertainty mapping" software which is processed by a processor in response to input data comprised of randomly scattered data samples.

In the prior art involving Conditional Simulation, the estimation at any spatial location (x,y,z) of the value of a gaussian random variable from a set of scattered data samples is accomplished by a method known as "Kriging" [as previously mentioned, refer to either: (1) Journel, A. G. "Fundamentals of Geostatistics in Five Lessons", Short course in Geology, vol 8, 44 pp, AGU, Washington, D.C. 1989, or (2) Deutsch, Clayton V. and Andre Journel, "GSLIB Geostatistical Software Library and User's Guide second edition", Oxford University Press, New York, Oxford, 1998]. The result of estimating this value at a regular grid results in a smooth surface of the expected value generally following the data. If the principle of exactitude is applied, this surface will actually go through the data if the data falls on a grid location. The error variance is also calculated at each grid location. At the data locations, this error variance equals zero unless the observation error variance is included in the calculation, in which case, this is the error variance at the data locations. It is common practice to render a more realistic estimate of the variable by randomizing the answer using the estimated error variance. This is called a 'conditional simulation' because it is conditioned by the data and produces one out of any number of possible realizations. For a teaching on 'conditional simulation', refer to: "Fundamentals of Geostatistics in Five Lessons", by A. G. Journel, Short course in Geology, vol 8, 40 pp, AGU, Washington, D.C. 1989.

For example, in order to "Krige the expected value and standard deviation", consider the following equations [refer to reference (2): Deutsch, Clayton V. and Andre Journel, "GSLIB Geostatistical Software Library and User's Guide second edition", Oxford University Press, New York, Oxford, 1998, page 14, equations II.12 and II.13]:

$$Z_{SK}^*(u) = \Sigma \lambda_\alpha(u) Z(u_\alpha) + (1 - \Sigma \lambda_\alpha(u)) m \quad (1)$$

The corresponding minimized estimation variance is:

$$\sigma_{SK}^2(u) = C(0) - \Sigma \lambda_\alpha(u) C(u - u_\alpha) \quad (2)$$

For ordinary "Kriging", the sum of the set of weights is constrained to unity, which leads to:

$$Z_{OK}^*(u) = \Sigma \lambda_\alpha(u) Z(u_\alpha) \quad (3)$$

where:
$Z_{SK}^*(u)$=estimate of unsampled data value at location 'u' using "simple kriging",
$\lambda_\alpha(u)$=weights determined to minimize the estimation variance,
$Z(u_\alpha)$=neighboring data values used in the estimate where $\alpha=1, \ldots, n$,
m=the a priori known stationary mean of the data, and
$C(u-u_{60})$=covariance.

The "Kriging" estimate is also known as the 'expected value' or the 'local mean' of the estimated distribution of the data, and the estimation variance as the squared standard deviation of the distribution:

$$\mu_1 = \Sigma \lambda_\alpha(u) Z(u_\alpha) \quad (4)$$

Using the mean and the standard deviation, we may now execute a conditional stochastic simulation as follows:

$$xp = F^{-1}\{rand[p(0|1)]\} \quad (5)$$

$$\xi = xp \cdot \sigma_1 + \mu_1 \quad (6)$$

where:
$F^{-1}$=inverse gaussian transform,
$\mu_1$=estimated local mean,
$\sigma_1$=estimated local standard deviation,
xp=data value corresponding to p,
p=randomized probability, and
$\xi$=estimated stochastic variable.

In accordance with the present invention, a new method and associated apparatus will generate probability maps, cutoff maps, and confidence limit maps (collectively "risk-related maps") in one single operation. In addition, in accordance with the present invention, given the novel methods of the present invention for generating the probability maps, cutoff maps, and confidence limit maps, the new method and apparatus of the present invention will also generate a cube which illustrates a set of earth formation characteristics disposed within a cubic volume of an earth formation, the cube including a plurality of gridded cross sections, the grid of each cross section including a plurality of intersections, the novel method of the present invention generating a 'corrected value' for each intersection of each grid of each cross section in the cube.

Referring to FIG. 1, a computer system (e.g., a workstation computer system) is illustrated and it includes a processor 10 connected to a system bus 12, a recorder or display device 14 connected to the system bus 12, a memory or other storage device (e.g., a computer readable medium) 16 connected to the system bus 12, and a source of input data 18 comprised of a set of randomly scattered data samples 18, such as the randomly scattered data samples shown in FIGS. 4, 5, and 6. A CD-Rom 20 stores a novel software known as the "uncertainty mapping software", the uncertainty mapping software on the CD-Rom 20 being loaded into the computer system and stored in the memory 16 of the computer system. Now that the software is loaded into the computer system, the "uncertainty mapping software" will hereinafter be referred to as the "uncertainty mapping software 16".

The computer system of FIG. 1 may be a personal computer (PC), a workstation, a mainframe, etc. Examples of possible workstations include a Silicon Graphics Indigo 2 workstation and a Sun SPARC workstation. The processor 10 of the computer system may be, for example, a microprocessor, microcontroller, or a mainframe or workstation processor. The memory 16 may be, for example, a hard disk, ROM, CD-Rom, DRAM, or other RAM, flash memory, magnetic storage, optical storage, registers, or other volatile and or non-volatile memory.

When the uncertainty mapping software 16 of the present invention is executed by the processor 10 of FIG. 1, the processor 10 will generate and display (via the recorder or display device 14 of FIG. 1) three different types of risk-related maps: (1) Probability maps, (2) Lower cutoff maps, and (3) Confidence limit maps (also called "confidence maps) in one single operation. In addition, the processor 10 will generate and display the cube which illustrates the set of earth formation characteristics disposed within a cubic volume of an earth formation. The cube and each of the three different types of risk-related maps will be discussed in the following paragraphs.

Figure 2:
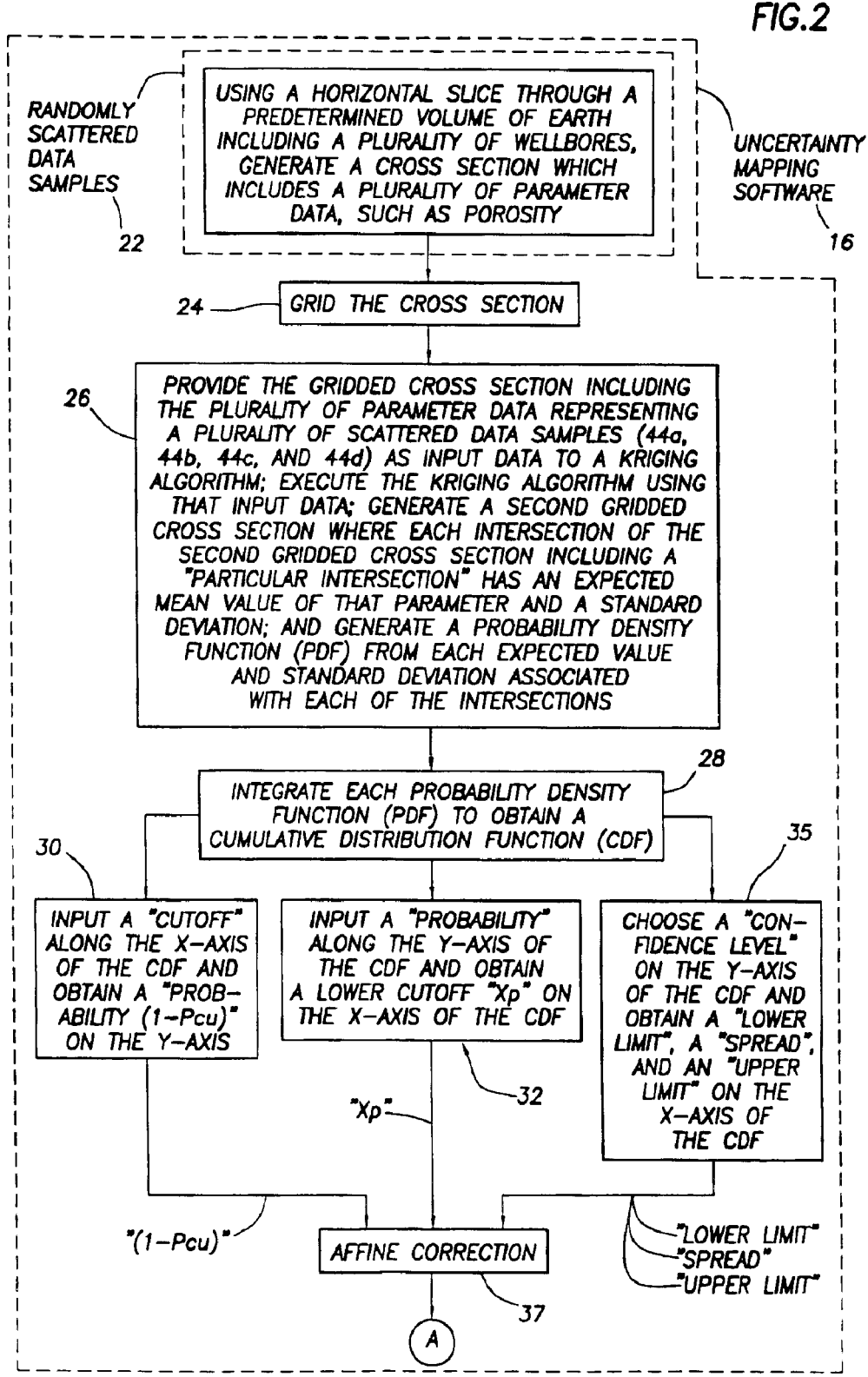

Referring to FIGS. 2 and 3, when the uncertainty mapping software 16 of FIG. 1 produces the cube and the Probability maps and the lower cutoff maps and the confidence limit maps, the computer system of FIG. 1 executes the uncertainty mapping software 16 of the present invention. When executed, the uncertainty mapping software 16 performs a new method which uses the estimated gaussian distribution at each grid location (intersection) given by the expected value and the error variance. When the Uncertainty Mapping Software 16 is executed by the processor 10 of FIG. 1, the new method that is performed for generating a new and novel "cube", as well as the "probability map", "lower cutoff map" and "confidence limit map", is illustrated in the flowchart block diagram shown in FIGS. 2 and 3.

The novel method of the present invention for generating the maps will be first discussed. When these novel methods for generating the maps is understood, the novel method for generating the cube will be discussed.

In FIGS. 2 and 3, referring initially to FIG. 2, each probability value ["(1−Pcu)"] on the "Probability map", and each lower cutoff "Xp" on the "lower cutoff map", and each "lower limit, spread, and upper limit" on each of three types of "confidence limit maps" (located at each intersection of a grid imposed on the map) is determined by performing the following method steps:

(1) Using a horizontal slice through a predetermined volume of earth including a plurality of wellbores, generate a cross section which includes a plurality of parameter data, such as porosity, block 22;
(2) grid the cross section, block 24;
(3) Provide the gridded cross section including the plurality of parameter data representing scattered data samples 44a, 44b, 44c, and 44d as input data to a Kriging algorithm, execute the Kriging algorithm using that input data, and generate a second gridded cross section where each intersection of the second gridded cross section including a "particular intersection" has an expected (mean) value of that parameter and a standard deviation; generate a Probability Density Function (PDF) from each expected value and standard deviation associated with each of the intersections of the grid, block 26;

(4) Integrate each Probability Density Function (PDF) to obtain a Cumulative Distribution Function (CDF) [recall that the area under the PDF curve is represented by the CDF], block 28;

(5) Input a cutoff along the x-axis of the CDF and obtain a probability "Pcu" on the y-axis, block 30;

(6) Correct the probability "Pcu" by performing an "affine correction" on the probability Pcu, block 37; and (7) In FIG. 3, assign the corrected value "(1-Pcu) [corrected]" to the "particular intersection" and assign a unique color to that corrected value, block 39 in FIG. 3.

The probability "(1-Pcu)" represents the probability that a parameter is greater than the cutoff. In our examples to follow, the "parameter" will be porosity; however, understand that the above method will work in connection with other types of parameters, including but not limited to porosity.

In addition, each lower cutoff "Xp" on the "lower cutoff map" (located at each intersection of a grid imposed on the map) is determined by performing the following additional method steps:

(8) In FIG. 2, input a 'probability' along the y-axis of the cumulative distribution function (CDF) and obtain a lower cutoff "Xp" on the x-axis of the CDF, block 32, FIG. 2;

(9) Correct the lower cutoff "Xp" by performing an "affine correction" on the lower cutoff "Xp", block 37; and

(10) In FIG. 3, assign the corrected value "Xp (corrected)" to the "particular intersection" and assign a unique color to that corrected value, block 41 in FIG. 3.

In addition, each "lower limit", "spread", and "upper limit" on three different types of "confidence limit maps" (located at each intersection of a grid imposed on the map) is determined by performing the following additional method steps:

(11) In FIG. 2, choose a "confidence level" on the y-axis of the CDF and obtain a "lower limit", a "spread", and an "upper limit" on the x-axis of the CDF, block 35;

(12) Correct the "lower limit", the "spread", and the "upper limit" by performing an "affine correction" on the "lower limit", the "spread" and the "upper limit", block 37;

(13) In FIG. 3, assign the corrected value "lower limit (corrected)" to the "particular intersection" and assign a unique color to that corrected value, block 43 in FIG. 3,

(14) assign the corrected value "spread (corrected)" to the "particular intersection" and assign a unique color to that corrected value, block 45 in FIG. 3, and

(15) assign the corrected value "upper limit (corrected)" to the "particular intersection" and assign a unique color to that corrected value, block 47 in FIG. 3.

Each of these steps will be discussed in detail with reference to FIGS. 4 through 32.

Referring to FIGS. 4 through 32, and referring initially to FIG. 4, block 22 of FIG. 3 indicates that, using a horizontal slice through a predetermined volume of earth including a plurality of wellbores, a cross section through that earth volume is generated, the cross section including a plurality of parameter data. One example of that parameter data is "porosity". However, it should be understood that the method and associated apparatus of the present invention, illustrated in FIGS. 2 and 3, will also work in connection with other types of parameter data (other than porosity, which is being used by way of example only). The parameter data in the cross section represents the randomly scattered data samples 18 of FIG. 1. In FIG. 4, the predetermined volume of earth 34 has a cross section 36 passing therethrough. A plurality of wellbores 38 have been drilled in that volume of earth 34, the wellbores 38 passing through the cross section 36. In FIG. 5, one of those wellbores 38a is illustrated. The cross section 36 passes through the wellbore 38a of FIG. 5. A well logging tool 40 in the wellbore 38a generates a well log 42. The y-axis of that well log 42 represents units of a particular parameter (the x-axis being units of depth). In our example, we use the following parameter, but only by way of example for purposes of this discussion: porosity. Therefore, in FIG. 5, the intersection between the cross section 36 and the well log 42 represents a particular parameter value (e.g., porosity), as indicated by the "X" 44. As a result, in FIG. 4, the cross section 36 includes a plurality of parameter values 44a, 44b, 44c, and 44d (of porosity, which parameter is being used in our example for purposes of discussion only). In FIG. 6, that cross section 36 is illustrated again, and the plurality of parameter values (e.g., of porosity) 44a through 44d from FIG. 4 are located and illustrated in that cross section 36.

In FIG. 6, the cross section 36 of FIG. 6 including the plurality of parameter values (e.g., of porosity) 44a through 44d in that cross section represent the "randomly scattered data samples" 18 of FIG. 1.

In FIGS. 2 and 3, blocks 24, 26, 28, 30, 32, 35, 37, 39, 41, 43, 45, and 47 collectively comprise the "Uncertainty mapping software" 16 stored in the memory 16 of FIG. 1. Blocks 24, 26, 28, 30, 32, 35, 37, 39, 41, 43, 45, and 47 of FIGS. 2 and 3 representing the Uncertainty Mapping Software 16 of FIG. 1 are discussed below with reference to FIGS. 7 through 28 of the drawings.

Recall block 24 of FIG. 2: "grid the cross section". Therefore, in FIG. 7, the first task at this point is to grid the cross section 46. In FIG. 7, grid lines 48 are drawn in the cross section 46, but the parameter values (of porosity in our example) 44a through 44d do not fall on an intersection of the grid 48. In accordance with block 24 of FIG. 2, the cross section 36 has been gridded as shown in FIG. 7.

Recall block 26 of FIG. 2: provide the gridded cross section including the plurality of parameter data as input data to a Kriging algorithm, execute the Kriging algorithm using that input data, and generate a second gridded cross section where each intersection of the second gridded cross section including a "particular intersection" has an expected (mean) value of that parameter and a standard deviation; and generate a Probability Density Function (PDF) from each "expected value standard deviation" associated with each of the intersections.

In FIG. 8, the gridded cross section of FIG. 7 including the plurality of parameter values (e.g., of porosity data) 44a through 44d are provided as input data to a Kriging Algorithm 50 (the Kriging algorithm has already been discussed in the above paragraphs). The Kriging algorithm is executed using that input data, and, responsive thereto, the Kriging algorithm generates a second gridded cross section 52 as shown in FIG. 9, where each intersection of the second gridded cross section 52 (which includes a particular intersection 54) has two values corresponding thereto: (1) an expected (mean) value of the parameter (in our example, an expected value of porosity), and (2) a standard deviation, block 56 of FIG. 9. That is, each intersection 54, 58, 60, 62, ..., etc of the second gridded cross section 52 has its own "expected value" of a parameter and its own "standard deviation" corresponding thereto. The Kriging algorithm 50 performs a type of interpolation, using the parameter values (of porosity in our example) 44a, 44b, 44c, and 44d, to determine a corresponding expected (mean) value of a parameter at each intersection 54, 58, etc, and a corresponding value of "standard deviation" at each intersection 54, 58, etc, of the second gridded cross section 52 in FIG. 9. Since we are using porosity by way of example only, at each intersection 54, 58, etc, of FIG. 9, a unique expected (mean) value of porosity and a unique standard deviation will associated with each intersection of the grid shown in FIG. 9.

In FIG. 10, let us examine, as an example, the intersection 54 of the second gridded cross section 52 of FIG. 9. Intersection 54 now has two values of data associated therewith: (1) a "particular expected (mean) value" of a parameter (such as "porosity" in our example), where the expected value of the parameter is determined using an interpolation technique performed by the Kriging algorithm 50 which utilizes the randomly scattered parameter values (of porosity in our example) 44a–44d of FIG. 6, and (2) a "particular standard deviation" (also determined by the Kriging algorithm 50), block 64 of FIG. 10.

Figure 10A:
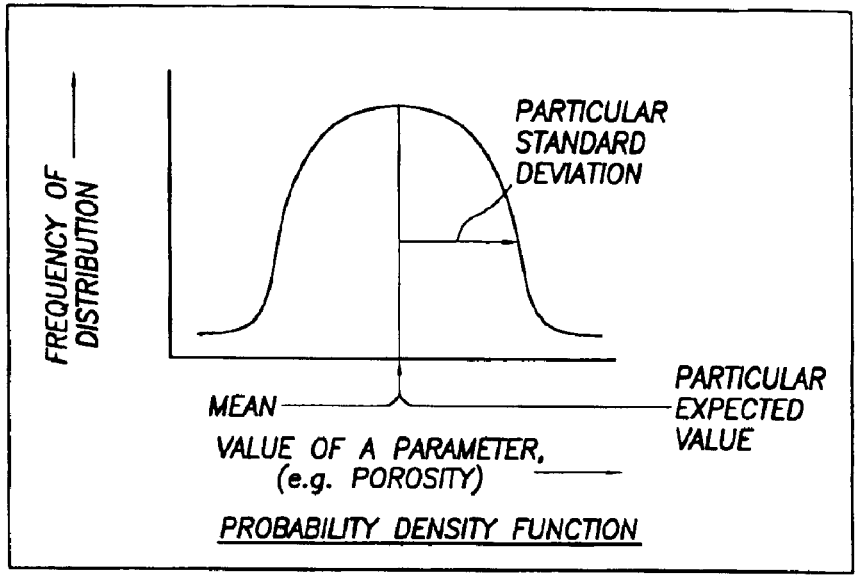

In FIG. 10a, using the "particular expected (mean) value" and the "particular standard deviation" which are both associated with intersection 54 and which were both determined above with reference to FIGS. 9 and 10, a "particular Probability Density Function (PDF)" can now be determined, and that "particular Probability Density Function (PDF)" will now be associated with intersection 54. That "particular Probability Density Function (PDF)" is illustrated in FIG. 10a.

Figure 11:
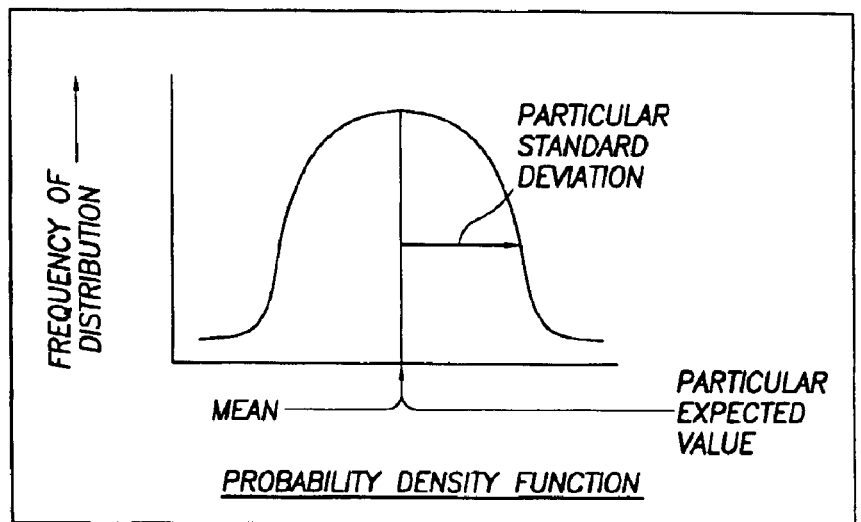

In FIGS. 11, 12, and 13, the "particular Probability Density Function (PDF)" shown in FIG. 10a which is specifically associated with intersection 54 of the gridded cross section shown in FIG. 10, is illustrated again in FIG. 11 for purposes of this discussion. Recall block 28 of FIG. 2: "integrate each Probability Density Function (PDF) to obtain a "Cumulative Distribution Function". Therefore, in FIG. 11, integrate the Probability Density Function to thereby obtain the "Cumulative Distribution Function" (CDF), block 66 of FIG. 12. That "Cumulative Distribution Function (CDF)" is illustrated in FIG. 13. However, since the "particular Probability Density Function (PDF)" of FIGS. 10a and 11 is specifically associated with intersection 54 of the gridded cross section shown in FIG. 10, the "Cumulative Distribution Function (CDF)" of FIG. 13 is also specifically associated with intersection 54 of the gridded cross section shown in FIG. 10.

Probability Map

A "probability map" is generated by plugging in the desired lower cutoff and evaluating the probability "n" at any (x, y, z) location. That is, consider the following equations:

$$P_{100n}(xyz) = p\{\xi > co|xyz\} \quad (7)$$

$$xp = (co - \mu)/\sigma \quad (8)$$

$$n = F(xp) \quad (9)$$

where:

F=gaussian transform

Co=desired cutoff

P=calculated probability

σ=standard deviation

μ=mean

ξ=estimated variable

In FIGS. 2 and 14, recall block 30 of FIG. 2: "Input a 'cutoff' along the x-axis of the CDF and obtain a 'probability (1-Pcu)' on the y-axis". Therefore, in FIG. 14, block 68, the user operator inputs a 'cutoff' Xp along the x-axis of the CDF (e.g., 10%) and obtains a probability "Pcu" on the y-axis. The probability "Pcu" represents the probability that the parameter (e.g., porosity) is less than the cutoff "Xp". Therefore, when the probability "Pcu" is determined, the probability "(1-Pcu)" must represent the probability that the parameter is greater than the cutoff "Xp".

In FIG. 15, for example, the user inputs a "cutoff" (e.g., "Xp") on the x-axis of the Cumulative Distribution Function (CDF) and obtains a probability "Pcu" on the y-axis of the Cumulative Distribution Function of FIG. 15. The probability "Pcu" represents the probability that the parameter (e.g., porosity) is less than the cutoff "Xp". In order to obtain the probability that the parameter is greater than the cutoff "Xp", subtract "Pcu" from "1" to obtain "(1-Pcu)", as shown in FIG. 15.

In FIGS. 15 and 16, recall that the CDF of FIG. 15 is specifically associated with intersection 54 of the gridded cross section 52. In addition, recall that, for intersection 54 of the gridded cross section 52 of FIG. 10, "(1-Pcu)" is the probability that the parameter (such as porosity) is greater than the cutoff "Xp".

In FIG. 16, in order to plot one point on a specific "Probability map" which would represent or illustrate the probability that a parameter, such as porosity, is greater than a cutoff "Xp", assign and plot and superimpose onto intersection 54 of the gridded cross section 52 the value "(1-Pcu)" and then assign a unique color to intersection 54 which would specifically identify that value "(1-Pcu)".

Lower Cutoff maps

Figure 17:
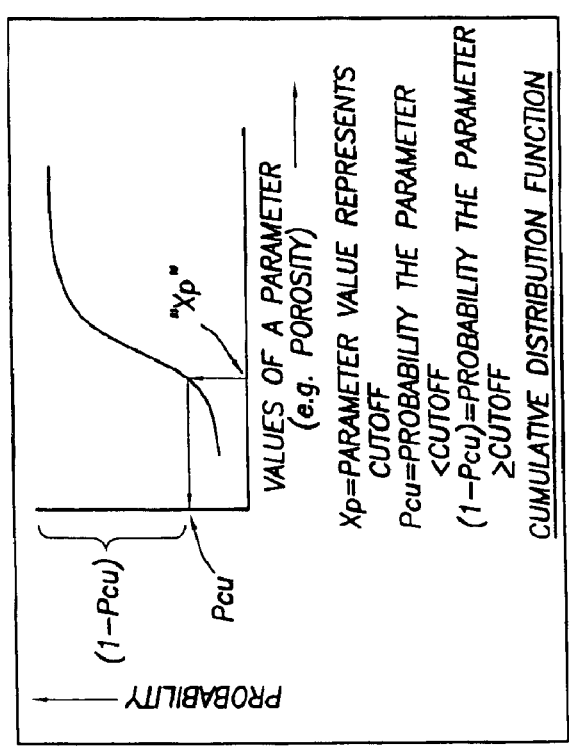
FIGS. 17 and 18 illustrate figures which are used during the discussion of the production of the cutoff map by the uncertainty mapping software of FIG. 1.
Figure 18:
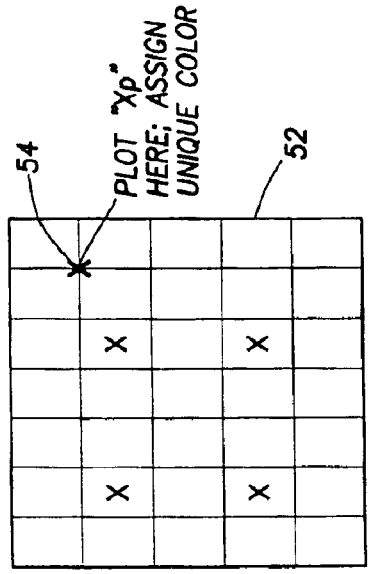

Referring to FIG. 17, when producing Lower Cutoff maps, by transforming the desired probability using the estimated local mean and standard deviation, the new method and apparatus of the present invention will produce a map of lower cutoff values. We can then say that, at any given (x, y) location, the "content" at that given (x, y) location (i.e., the value of a parameter, such as porosity, at that intersection, such as the intersection 54 of the gridded cross section 52) is at least the cutoff value of the parameter with a probability of, for example, ninety percent (i.e., n=0.9). That is, for a lower cutoff ø and a given probability $P_{100n}$:

$$co(xyz) = xp\{p = 0.9|xyz\} \quad (10)$$

$$xp = F^{-1}(p) \quad (11)$$

$$co = xp \cdot \sigma + \mu \quad (12)$$

where $F^{-1}$=inverse gaussian transform co=calculated cutoff p=desired probability σ=standard deviation μ=mean In FIGS. 2, 17, and 18, recall block 32 of FIG. 2: Input a 'probability' along the y-axis of the CDF and obtain a lower cutoff "Xp" on the x-axis of the CDF. In FIG. 17, input a probability "Pcu" on the y-axis of the Cumulative Distribution Function (CDF) and obtain a lower cutoff "Xp" on the x-axis of the CDF. In FIG. 18, since the CDF of FIG. 17 is specifically associated with intersection 54 of the gridded cross section 52, in order to plot one point on a specific "lower cutoff map", assign and plot and superimpose onto intersection 54 the value "Xp" and assign a unique color which will specifically identify the value "Xp". As a result, we can say that, at intersection 54 of the gridded cross section 52 in FIG. 18, the probability is "Pcu" that the value of a parameter, such as porosity, at the intersection 54 is at least the cutoff value "Xp".

Confidence Limit maps

Figure 19:
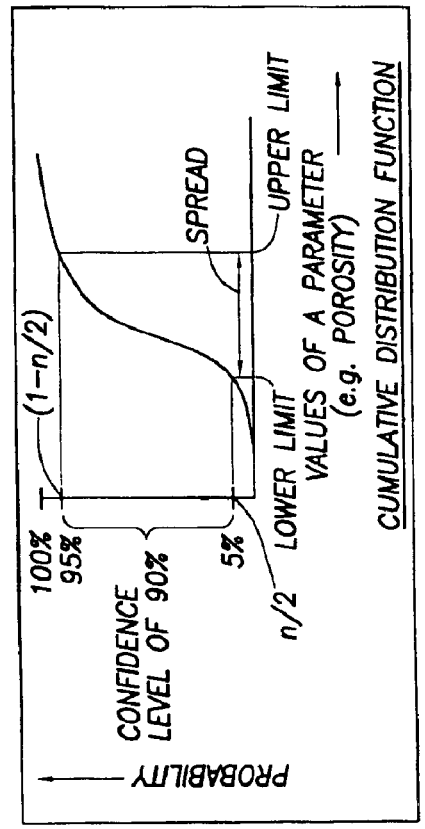
FIGS. 19 through 22 illustrate figures which are used during the discussion of the production of the confidence limit map by the uncertainty mapping software of FIG. 1.

Referring to FIG. 19, when producing Confidence limit maps, a Confidence limit is obtained (i.e., a lower limit, an upper limit, and a spread) by using "half the compliment of the confidence level" and "one minus this measure" (on the y-axis of the CDF) to thereby produce, on the x-axis of the CDF: (1) a 'lower limit' of the 'content' or 'value of a parameter', and (2) an 'upper limit' of the 'content' or 'value of the parameter'. The difference between these two lower and upper limits is the data range (or 'spread') for the given confidence level. That is, for Lower and Upper Bounds for $P_{100n}$:

$$xp_u = F^{-1}(p_u) \quad (13)$$

$$co_u = xp_u \cdot \sigma + \mu \quad (14)$$

$$xp_1 = F^{-1}(p_1) \quad (15)$$

$$co_1 = xp_1 \cdot \sigma + \mu \quad (16)$$

$$\delta = xp_u - xp_1 \quad (17)$$

where p=confidence level

σ=standard deviation

μ=mean $xp_u$=upper confidence limit $xp_1$=lower confidence limit $co_u$=upper cutoff $co_1$=lower cutoff δ=spread In FIG. 2, recall block 35: choose a "confidence level on the y-axis of the CDF and obtain a "lower limit", a "spread", and an "upper limit" on the x-axis of the CDF.

In FIG. 19, for example, assume a given confidence level "p" of 90%, as illustrated in FIG. 19. The confidence limits are chosen symmetrically about the 50% probability point on the vertical axis. For a confidence level of 90%, this results in an upper confidence limit of 50+90/2=95% and a lower confidence limit of 50−90/2=5%. Refer now to FIG. 19, and note the upper and lower values on the y-axis of the Cumulative Distribution Function (CDF); that is, the lower value on the y-axis of the CDF is 5% and the upper value on the y-axis of the CDF is 95%. Starting at the 5% value on the y-axis of the CDF of FIG. 19, intersect the CDF curve in FIG. 19 and note the "lower limit" on the x-axis of the CDF in FIG. 19. Similarly, starting at the 95% value on the y-axis of the CDF of FIG. 19, intersect the CDF curve in FIG. 19 and note the "upper limit" on the x-axis of the CDF curve in FIG. 19. Furthermore, in FIG. 19, note that the difference between the "lower limit" and the "upper limit" on the x-axis of the CDF of FIG. 19 is called the "spread".

Figure 20:
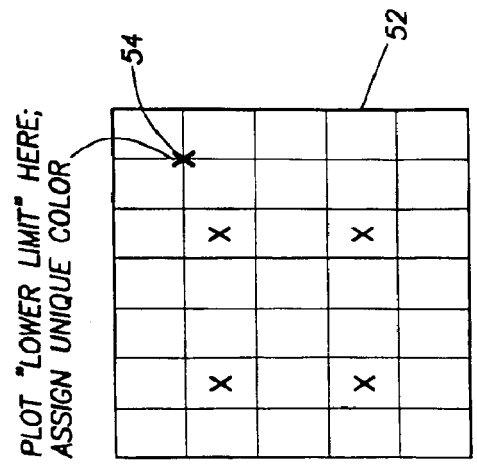

Referring to FIG. 20, the "lower limit" is plotted and assigned to intersection point 54, and a unique color is assigned to that "lower limit".

Figure 21:
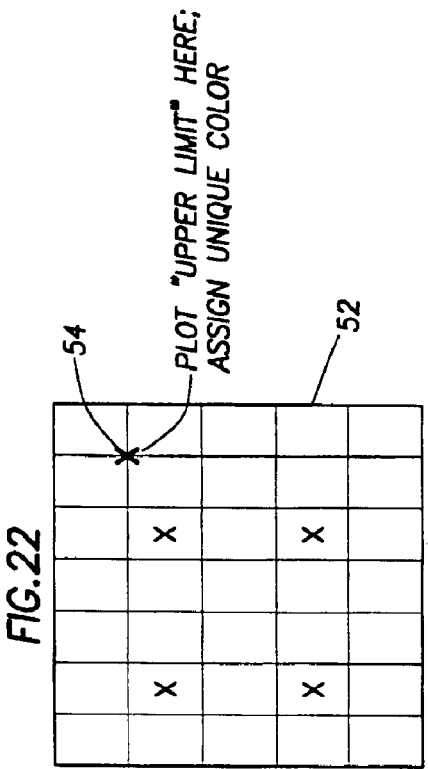

Referring to FIG. 21, the "spread" is plotted and assigned to intersection point 54, and a unique color is assigned to that "spread".

Figure 22:
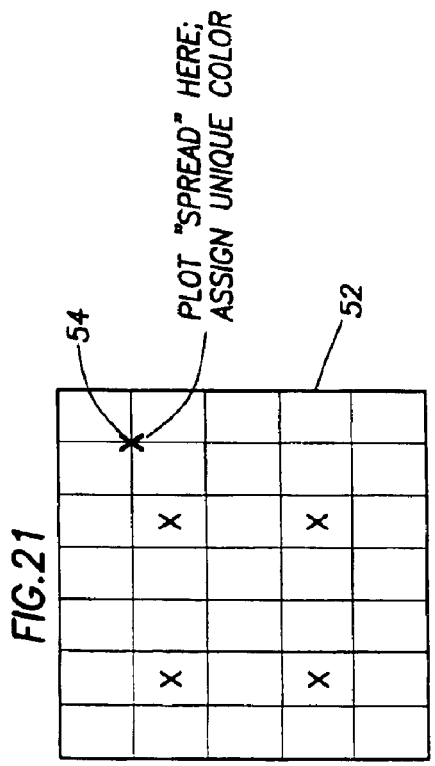

Referring to FIG. 22, the "upper limit" is plotted and assigned to intersection point 54, and a unique color is assigned to that "upper limit".

In FIG. 2, recall the "affine correction" block 37.

Figure 23:
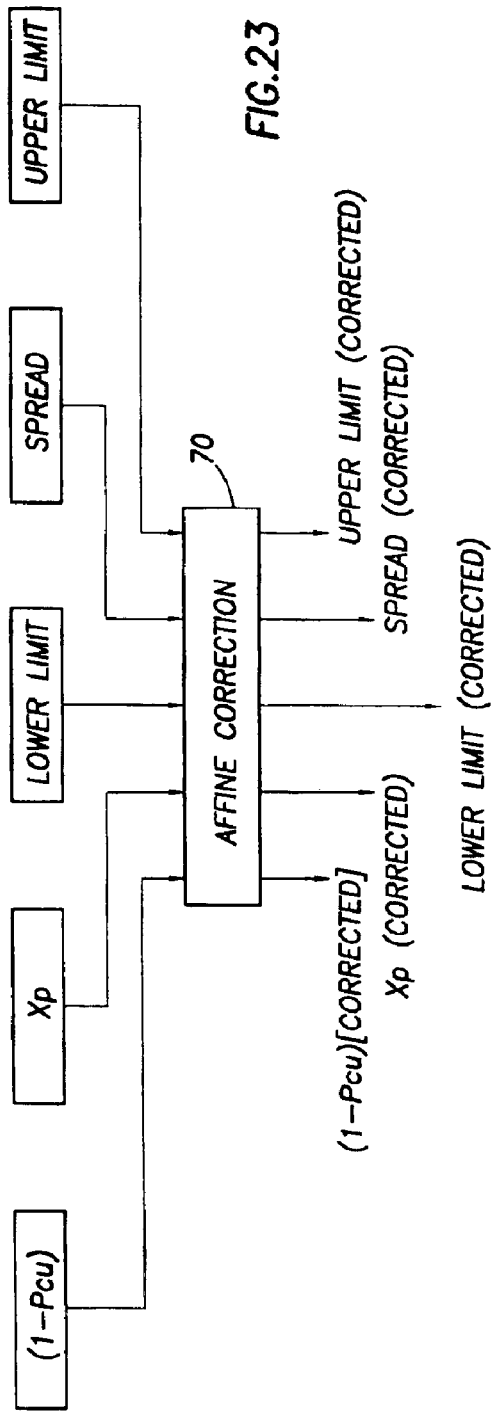
FIG. 23 illustrates the affine correction applied to the (1−Pcu), the Xp, the lower limit, the spread, and the upper limit.

Referring to FIG. 23, the values of '(1−Pcu)', 'Xp', 'lower limit', 'spread', and 'upper limit', which are assigned to intersection point 54 in FIGS. 16, 18, 20, 21, and 22, respectively, must now undergo an "affine correction". The "affine correction" will be discussed in detail below with reference to FIG. 29; however, suffice it to say at this point that the mean and the standard deviation associated with each of the original data (in FIG. 6) and each of the "Kriged" data (in FIG. 9) are not the same. That is, after Kriging (FIG. 8), the mean and standard deviation of each of the Kriged data (FIG. 9) is less than the mean and standard deviation of each of the original data (FIGS. 6 and 7). Therefore, in order to remedy this problem, the values of '(1−Pcu)', 'Xp', 'lower limit', 'spread', and 'upper limit' must undergo the "affine correction", prior to plotting and assigning such values to the intersection point 54 of the gridded cross section 52, in order that the mean and standard deviation of each of the Kriged data after undergoing the "affine correction" (FIG. 23) is equal to the mean and standard deviation of each of the original data (FIGS. 6 and 7). In FIG. 23, therefore, each of the values '(1−Pcu)', 'Xp', 'lower limit', 'spread', and 'upper limit' undergo the "affine correction", block 70 of FIG. 23, thereby generating the following corrected values: '(1−Pcu) [corrected]', 'Xp(corrected)', 'lower limit (corrected)', 'spread (corrected)', and 'upper limit (corrected)'.

In FIG. 2, recall blocks 39, 41, 43, 45, and 47, wherein the corrected values '(1−Pcu) [corrected]', 'Xp(corrected)', 'lower limit (corrected)', 'spread (corrected)', and 'upper limit (corrected)' are assigned to the particular intersection and a unique color is assigned to that corrected value.

Referring to FIG. 24, the corrected value "(1−Pcu) [corrected]" is plotted and assigned to intersection point 54, and a unique color is assigned to that corrected value.

Referring to FIG. 25, the corrected value "Xp(corrected)" is plotted and assigned to intersection point 54, and a unique color is assigned to that corrected value.

Referring to FIG. 26, the corrected value "lower limit (corrected)" is plotted and assigned to intersection point 54, and a unique color is assigned to that corrected value.

Referring to FIG. 27, the corrected value "spread (corrected)" is plotted and assigned to intersection point 54, and a unique color is assigned to that corrected value.

Figure 28:
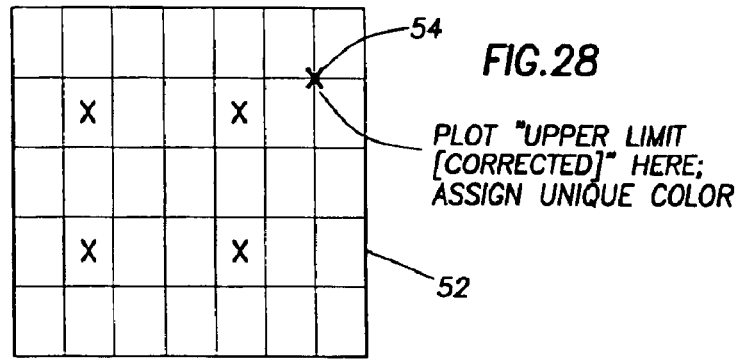

Referring to FIG. 28, the corrected value "upper limit (corrected)" is plotted and assigned to intersection point 54, and a unique color is assigned to that corrected value.

Figure 29:
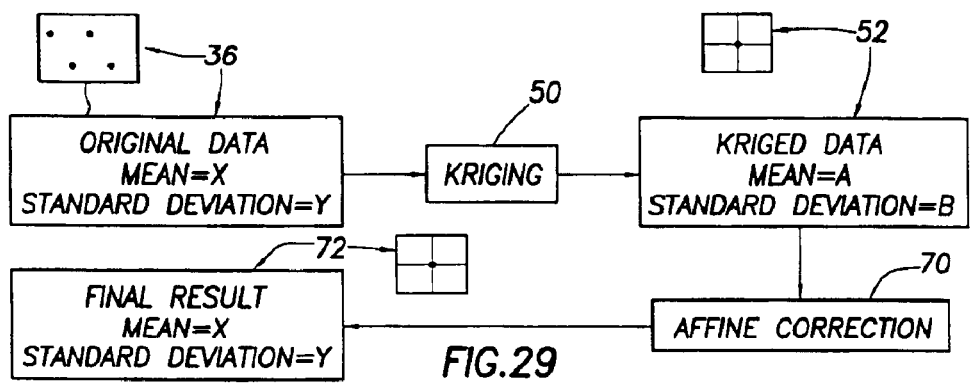
FIGS. 29 through 32 illustrates the function of the affine correction.

Referring to FIG. 29, regarding the "affine correction", in order to compensate for the smoothing effect of Kriging on the estimated mean and variance, an "affine correction" is applied to each value [such as '(1−Pcu)' and 'Xp' and 'lower limit' and 'spread' and 'upper limit'] that is assigned to each intersection (such as intersection 54) of the gridded cross section 52 shown in FIG. 9 (and FIGS. 16, 18, 20, 21, and 22). This is accomplished by co-generating the Kriged estimation grid. The mean and standard deviation of this Kriged estimation grid are then calculated and compared with the mean and standard deviation of the data. The correction ensures that the resulting maps are derived from the same global mean and standard deviation as the original data.

In order to Compensate for the smoothing effect for the lower cutoff map:

$$xp = F^{-1}(p) \qquad (18)$$

$$co = xp \cdot \sigma_1 + \mu_1 \qquad (19)$$

$$co' = (\sigma'/\sigma)(co - \mu) + \mu' \qquad (20)$$

where:
- $F^{-1}$ =inverse gaussian transform
- co=calculated cutoff
- p=desired probability
- $\sigma'$ =standard deviation of the original data
- $\sigma$ =standard deviation of the co-generated realization
- $\mu'$ =mean of the original data
- $\mu$ =mean of the co-generated realization
- co'=corrected cutoff In order to Compensate for the smoothing effect for the probability map:

$$co' = (\sigma/\sigma')(co - \mu') + \mu \qquad (21)$$

$$xp = (co' - \mu_1)/\sigma_1 \qquad (22)$$

$$p' = F(xp) \qquad (23)$$

where:
- F=gaussian transform
- co=desired cutoff
- $\sigma'$ =standard deviation of the original data
- $\sigma$ =standard deviation of the co-generated realization
- $\mu'$ =mean of the original data
- $\mu$ =mean of the co-generated realization
- co'=corrected cutoff
- p'=corrected probability In FIG. 29, for example, when the original data 36 (from FIG. 6 and 7), having a mean X and a standard deviation Y, are Kriged, via the Kriging Algorithm 50, the resultant Kriged data 52 is produced, where the resultant Kriged data 52 has a mean A and a standard deviation B, and where A<X and B<Y. However, when the Kriged data undergoes the affine correction 70, the final result 72 has a mean X and a standard deviation Y. The corrected values of '(1-Pcu) [corrected]', 'Xp(corrected)', 'lower limit (corrected)', 'spread (corrected)', and 'upper limit (corrected)' correspond to the final result 72.

Figure 30:
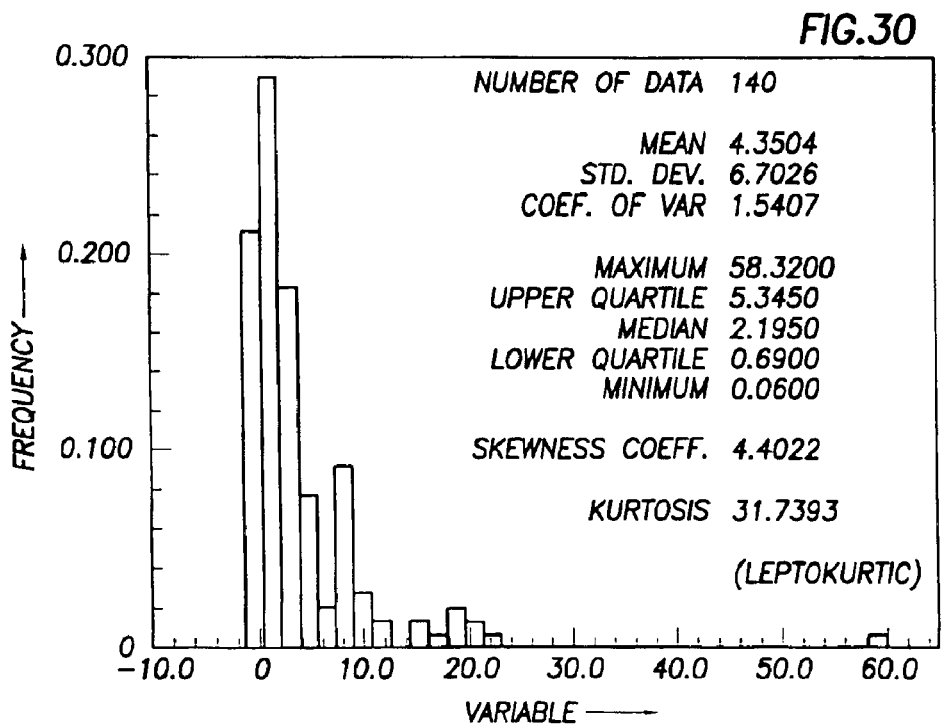
Figure 31:
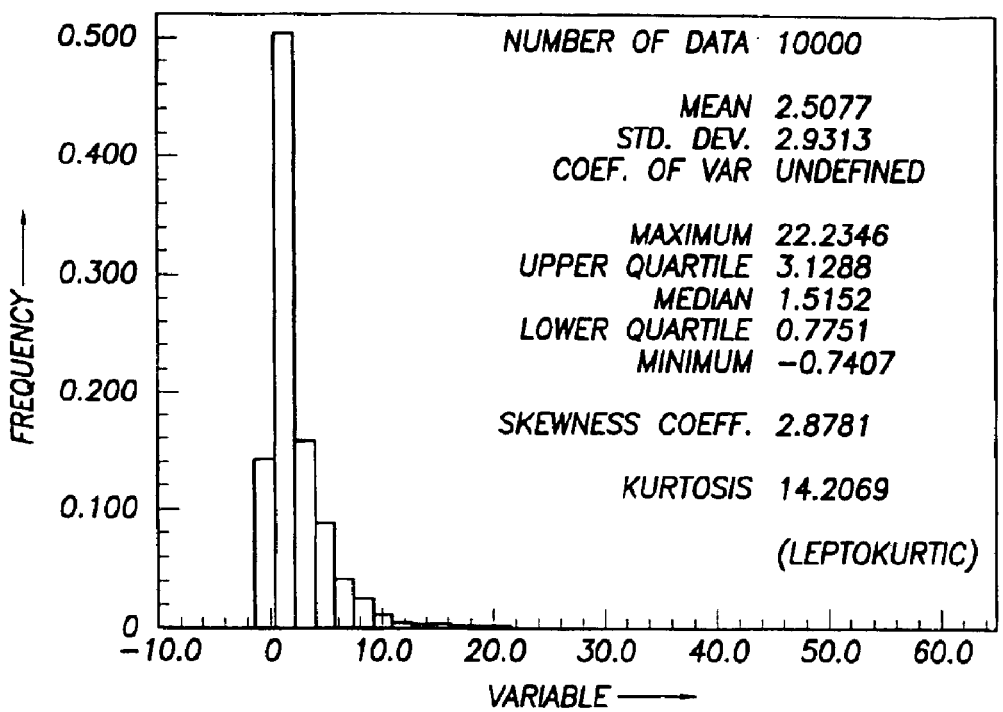
Figure 32:
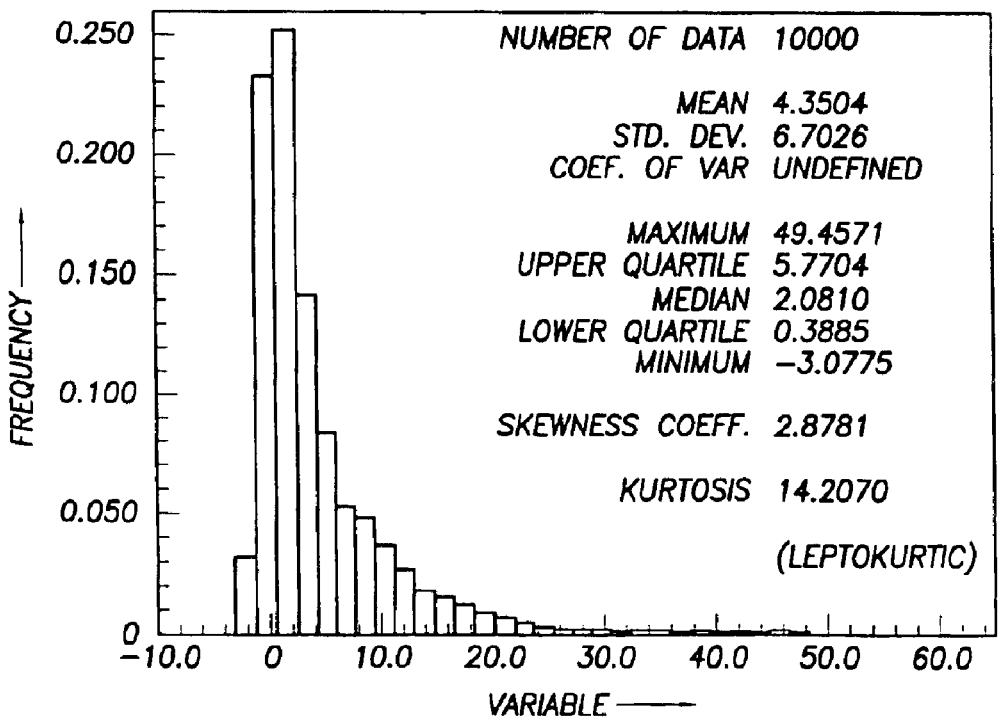

Referring to FIGS. 29, 30, 31, and 32, an example of a Probability Density Function representing the original data 36 of FIG. 29 is shown in FIG. 30 and note that the mean is 4.3504 and the standard deviation is 6.7026. However, an example of a Probability Density Function representing the Kriged data 52 of FIG. 29 is shown in FIG. 31 and note that the mean is 2.5077 and the standard deviation is 2.9313 (which is less than the mean of 4.3504 and the standard deviation of 6.7026 of the original data 36 shown in FIG. 30). On the other hand, an example of a Probability Density Function representing the Final Result 72 of FIG. 29, after the affine correction 70 has been applied to the Kriged data 52, is shown in FIG. 32 and note that the mean is 4.3504 and the standard deviation is 6.7026 (which is equal to the mean of 4.3504 and the standard deviation of 6.7026 of the original data 36 shown in FIG. 30).

Referring to FIGS. 33, 34, and 35, these figures will illustrate some of the above features.

Figure 33C:
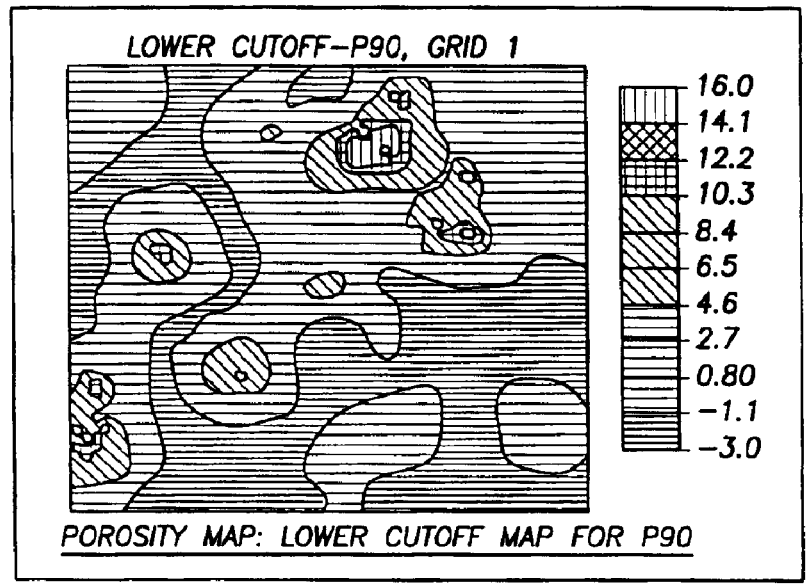
FIGS. 33 and 34 illustrates different examples of probability maps which are generated by the uncertainty mapping software of the present invention.
Figure 33D:
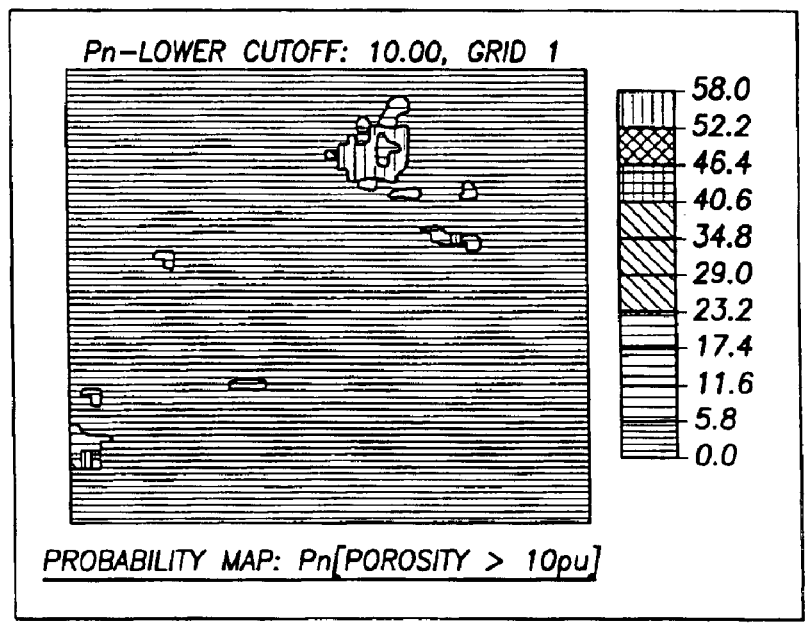

FIG. 33, which includes FIGS. 33a, 33b, 33c, and 33d, illustrates (in FIG. 33a) a "one-out-of-a hundred" realization generated with conditional simulation. FIG. 33c shows a lower cutoff porosity map with a probability of 0.9 illustrating that the actual porosity will be higher. FIG. 33d is the probability map for a user defined 10% lower cutoff porosity. FIG. 33b is a spread in porosity for a confidence level of 90%.

Figure 34C:
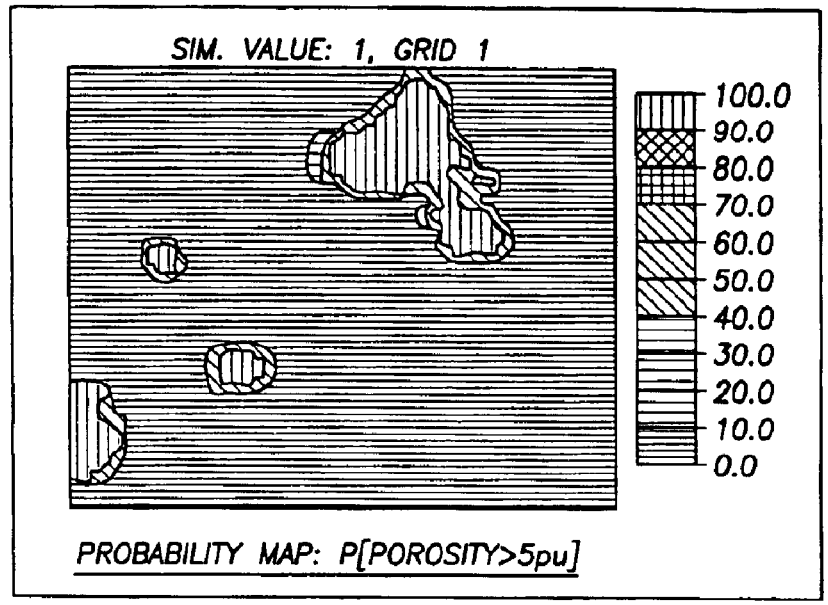
Figure 34D:
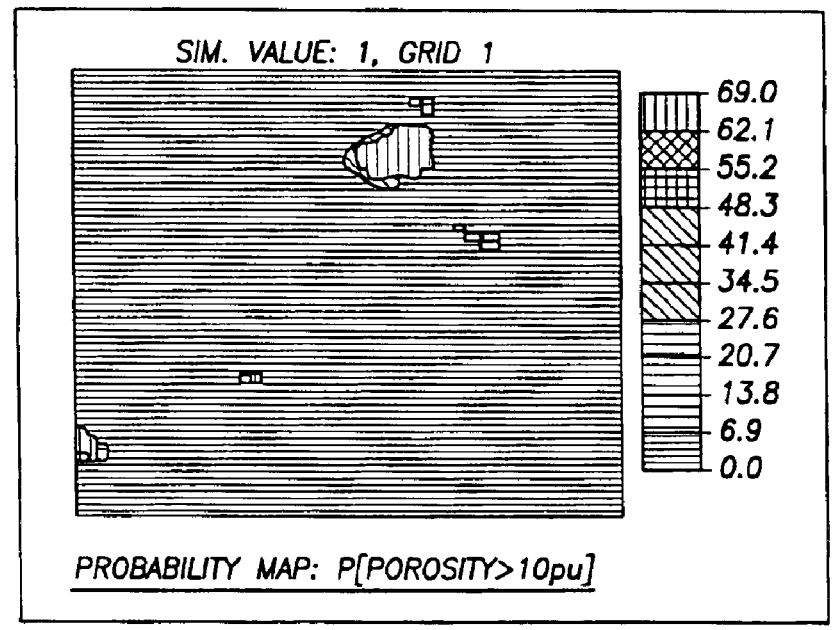

FIG. 34, which includes FIGS. 34a, 34b, 34c, and 34d, shows probability maps for different porosity cutoffs. As one would expect, the probability to find higher porosity cutoffs gets progressively smaller.

Figure 35C:
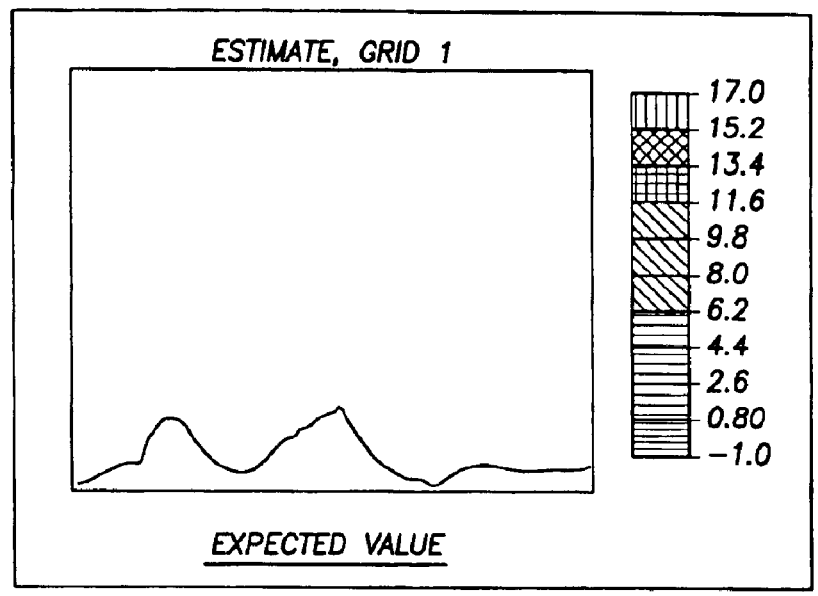
FIG. 35 illustrates Kriging with exactitude, including estimated value (FIG. 35a), error variance and without exactitude (FIG. 35b), expected value (FIG. 35c), and error variance of the expected value (FIG. 35d)
Figure 35D:
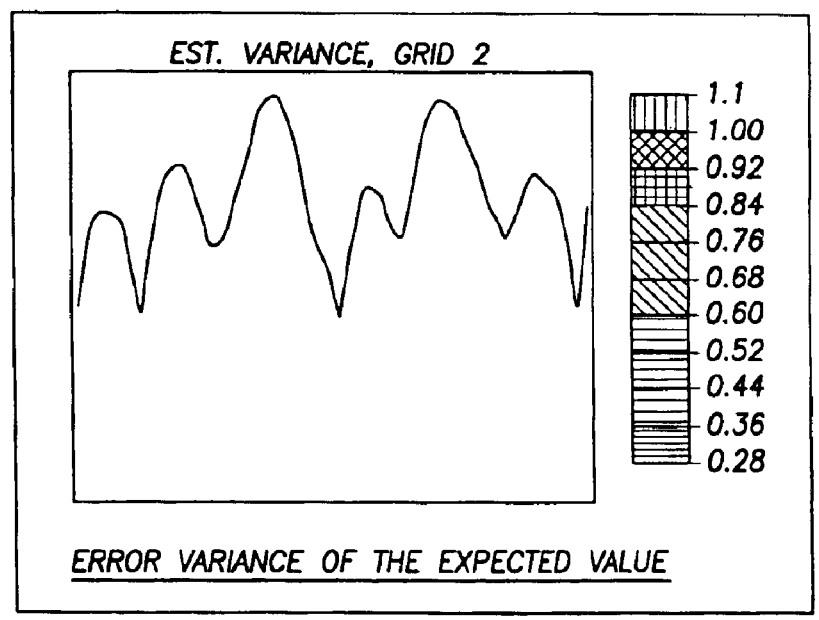

FIG. 35, which includes FIGS. 35a, 35b, 35c, and 35d, shows in cross section the effect which the exactitude principle has on the smoothness of the resulting surface as well on the error variance. Note that the examples are produced in two-dimensional maps, but the method is formulated as a general 3D solution.

In FIG. 4, recall that a cross section 36 through a cubic volume of earth formation 34, which includes a plurality of random variables (scattered data samples) 44a, 44b, 44c, and 44d, can be mapped; that is, a map can be generated which represents that cross section 36, such as the maps discussed above with reference to FIGS. 16, 18, 20–22, and 24–28.

Figure 36:
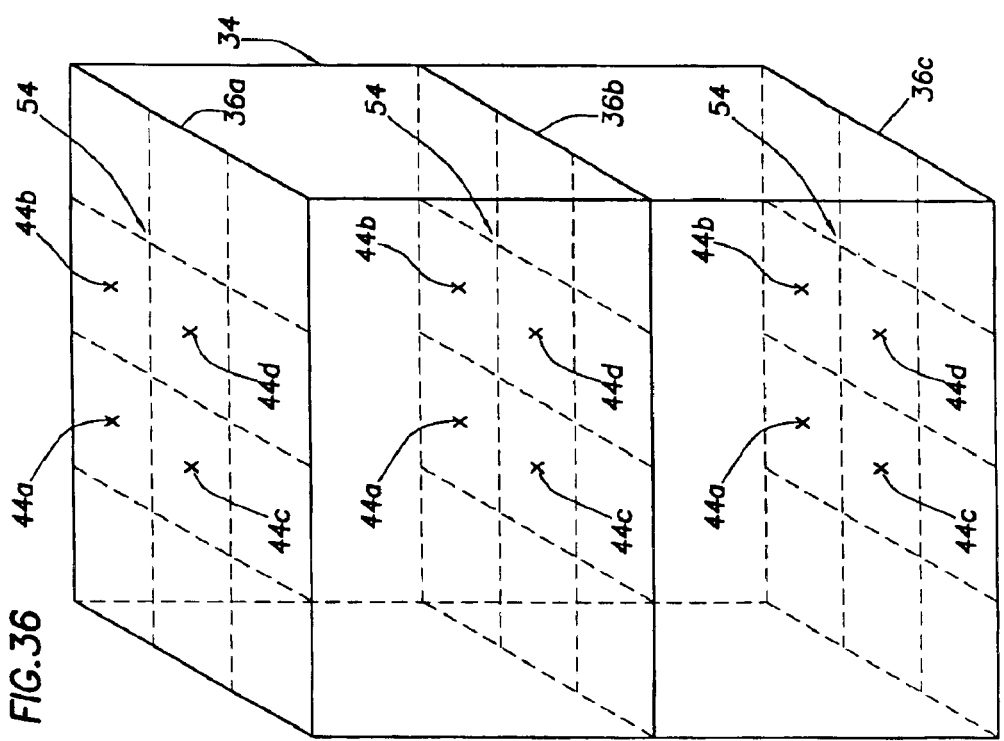

Referring to FIG. 36, the cubic volume of earth formation 34 of FIG. 4 is illustrated again in FIG. 36. However, in FIG. 36, the cubic volume of earth formation 34 includes three cross sections (provided as an example for purposes of this discussion only): cross section 36a, cross section 36b, and cross section 36c. Each cross section 36a through 36c includes the intersection 54 of FIGS. 9 and 10. In addition, each cross section 36a–36c includes the plurality of parameter values 44a through 44d. The above discussion with reference to FIGS. 1 through 29 disclosed how a 'corrected value' is assigned to the intersection 54 and a unique color is assigned to that corrected value. For example, in FIG. 24, the corrected value "(1–Pcu) [corrected]" was assigned to intersection 54 and a unique color was assigned thereto. Similarly, in FIGS. 25, 26, 27, and 28, the corrected values "Xp(corrected)", "lower limit(corrected)", "spread (corrected)", and "upper limit(corrected)" were assigned to intersection 54 and unique colors were assigned thereto. In FIG. 9, using the novel methods discussed above, other such 'corrected values' [i.e., (1–Pcu)[corrected], Xp(corrected), lower limit(corrected), spread(corrected), and upper limit (corrected)] are also assigned to all the other intersections, such as intersections 58 and 60 and 62, of the gridded cross section 52 of FIG. 9. As a result, in accordance with one aspect of the present invention, the maps of FIGS. 33, 34, and 35 were generated.

Figure 43:
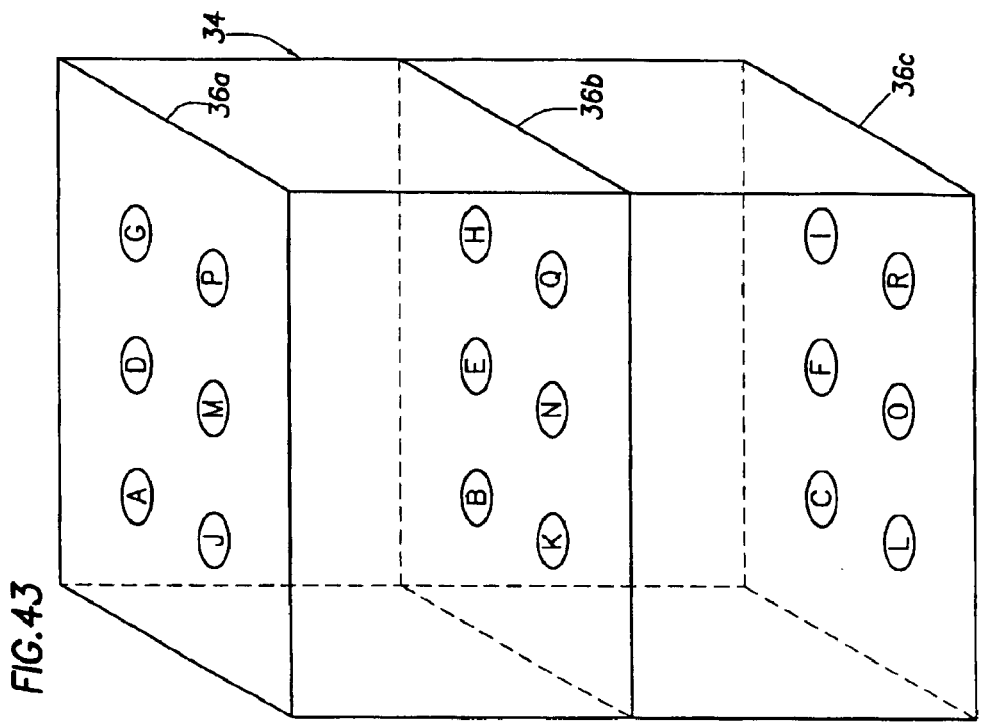

However, since the cubic volume of earth 34 of FIG. 36 comprises a plurality time slices horizons or cross sections 36a–36c, and since the novel methods of the present invention can generate a map for each such cross section, the novel methods discussed above which are practiced by the present invention can also be used to generate a cube 34, such as the cube 34 of FIG. 43. A method for generating a cube 34 is discussed below with reference to FIGS. 37 through 43 of the drawings.

Figure 37:
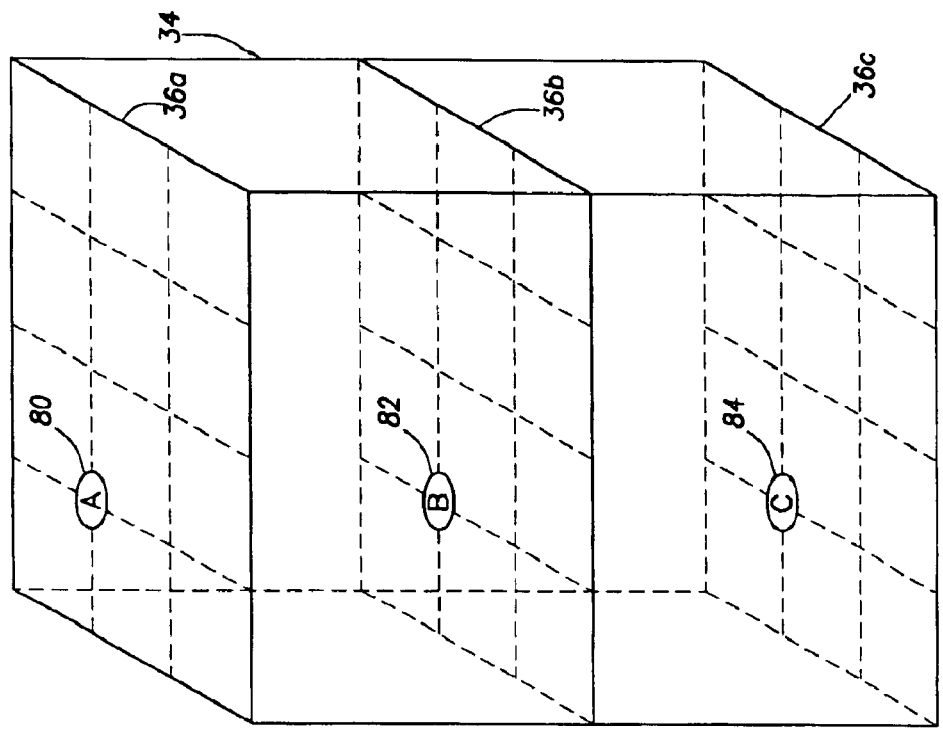
FIGS. 36 through 43 illustrate how the methods discussed in this specification in connection with FIGS. 1 through 35, for generating a probability map and a lower cutoff map and a confidence limit map, may be used for generating a cube which represents a cubic volume of an earth formation and illustrates a set of characteristics of the earth formation within that cube.

In FIG. 37, the novel methods discussed above for generating the 'corrected values' illustrated in FIG. 23 {i.e., '(1–Pcu) [corrected]', 'Xp(corrected)', 'lower limit (corrected)', 'spread(corrected)', and 'upper limit(corrected)'} are used to determine three 'corrected values' (i.e., corrected value A, corrected value B, and corrected value C) for assignment, respectively, to intersections 80, 82, and 84, as shown in FIG. 37.

Figure 38:
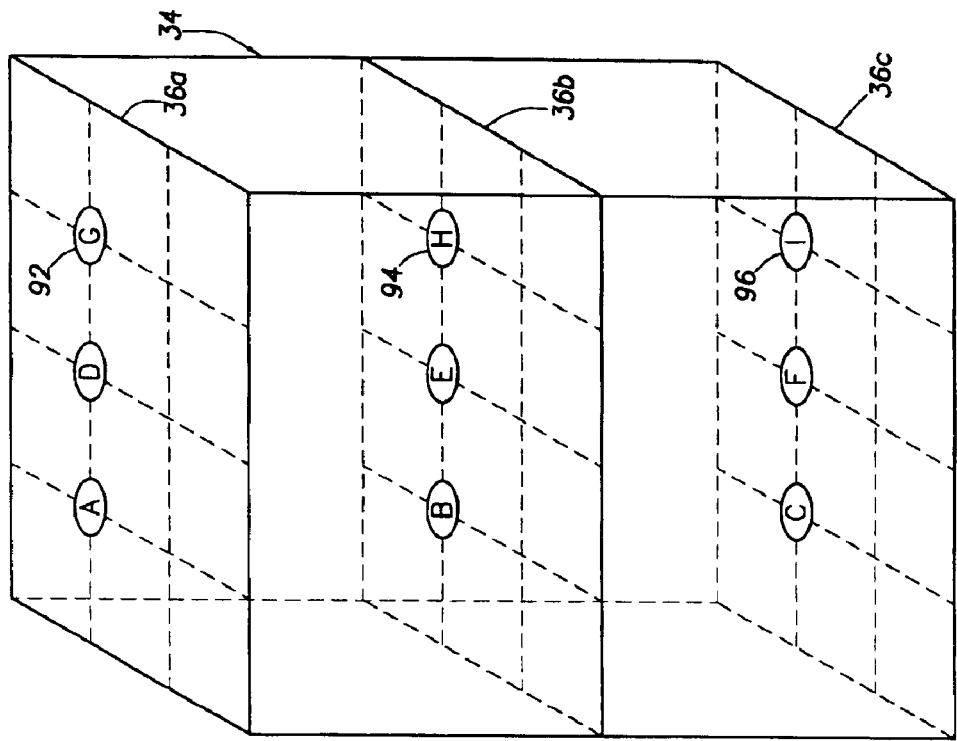

In FIG. 38, the novel methods discussed above for generating the 'corrected values' are used to determine three additional 'corrected values' D, E, and F for assignment, respectively, to intersections 86, 88, and 90, as shown in FIG. 38.

Figure 39:
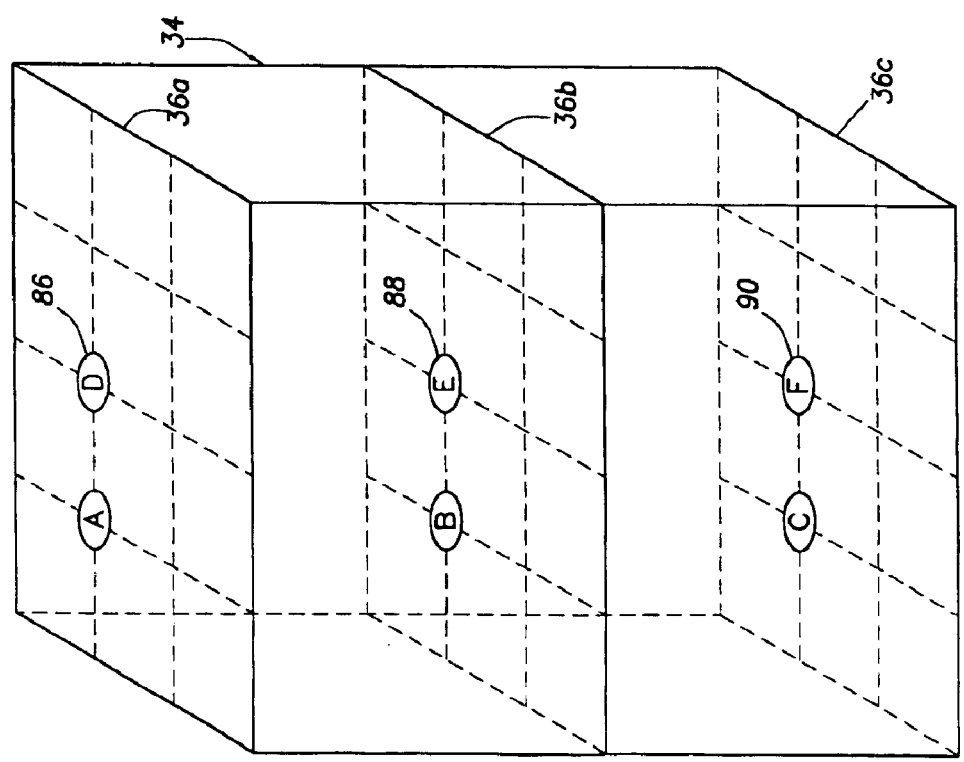

In FIG. 39, the novel methods discussed above for generating the 'corrected values' are used to determine three additional 'corrected values' G, H, and I for assignment, respectively, to intersections 92, 94, and 96, as shown in FIG. 39.

Figure 40:
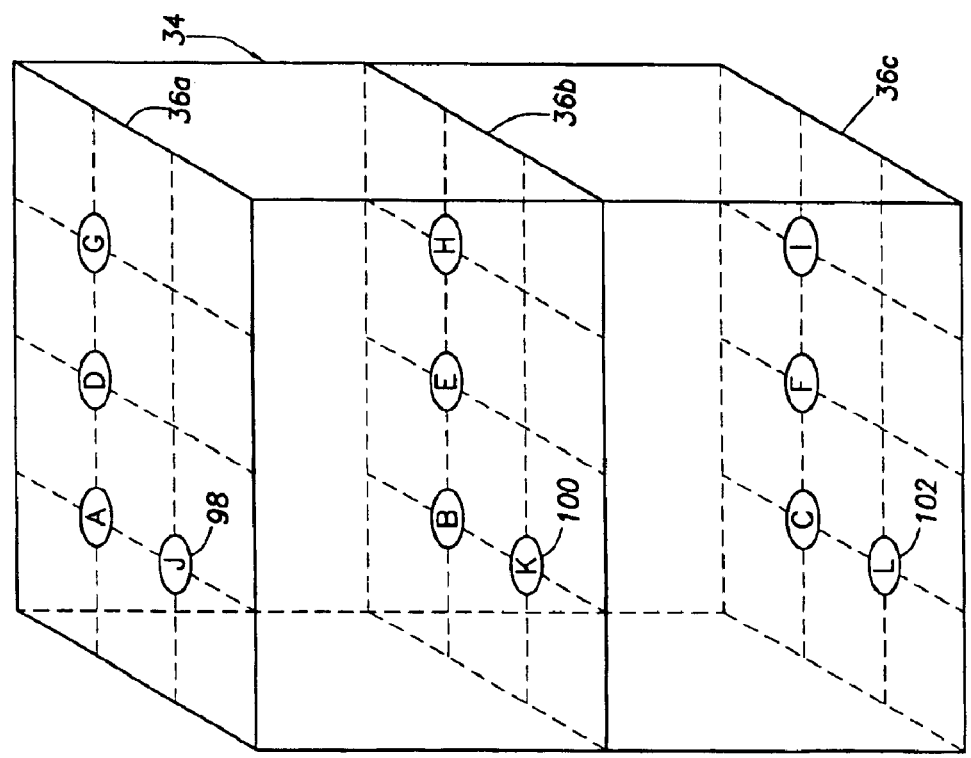

In FIG. 40, the novel methods discussed above for generating the 'corrected values' are used to determine three additional 'corrected values' J, K, and L for assignment, respectively, to intersections 98, 100, and 102, as shown in FIG. 40.

Figure 41:
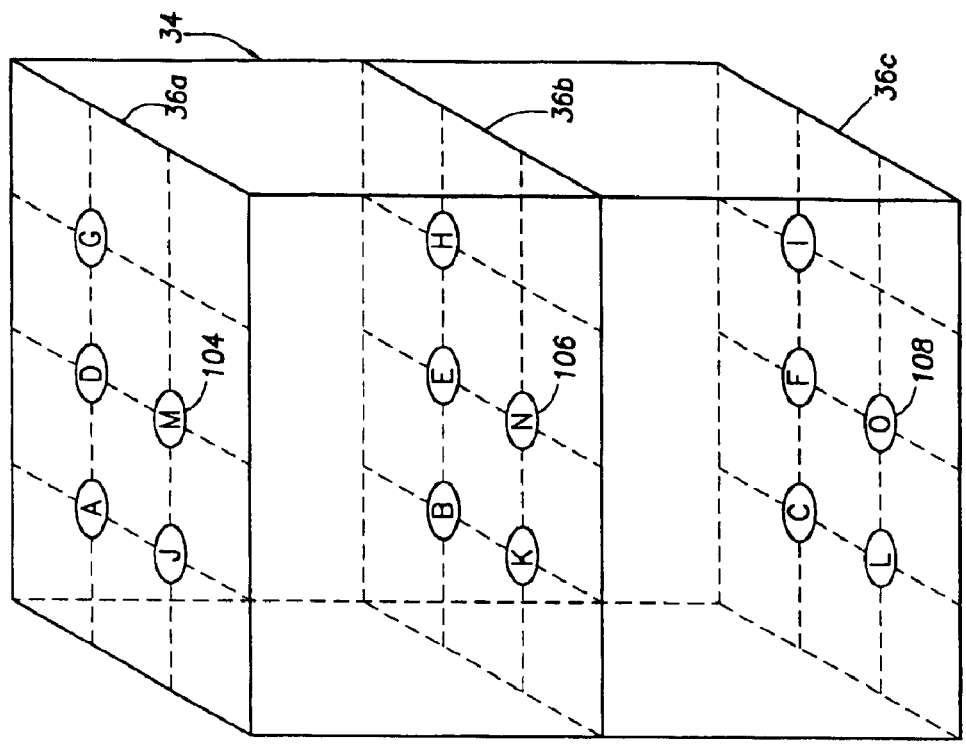

In FIG. 41, the novel methods discussed above for generating the 'corrected values' are used to determine three additional 'corrected values' M, N, and 0 for assignment, respectively, to intersections 104, 106, and 108, as shown in FIG. 41.

Figure 42:
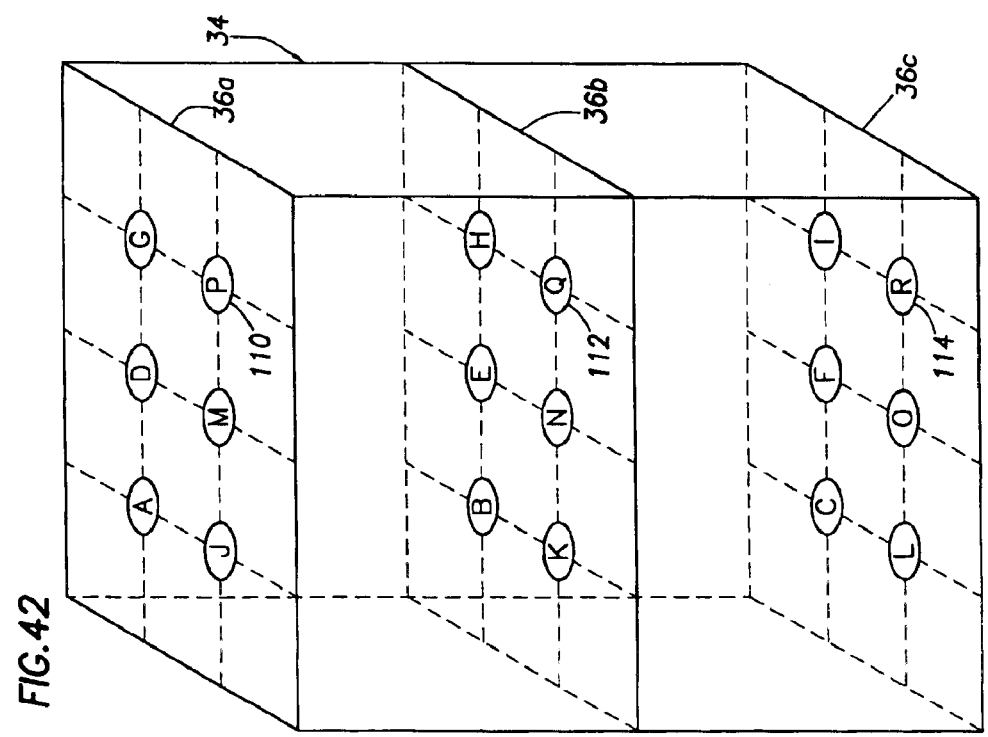

In FIG. 42, the novel methods discussed above for generating the 'corrected values' are used to determine three additional 'corrected values' P, Q, and R for assignment, respectively, to intersections 110, 112, and 114, as shown in FIG. 42.

In FIG. 43, when all the intersections on each cross section 36a, 36b, and 36c of the cube 34 have a 'corrected value' assigned thereto, the cube 34 of FIG. 43 will be generated. When unique colors are assigned to each such 'corrected value', a three dimensional (3D) cube, representing the cubic volume of earth 34 shown in FIG. 4, will be generated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of generating a map illustrating a set of risk-related characteristics of a cross section through an earth formation, representing a time slice passing horizontally through the formation or a horizon passing generally horizontally through said formation, in response to a plurality of scattered data observations on said cross section representing a plurality of parameters located at a plurality of locations on said cross section, comprising the steps of:

(a) gridding said cross section thereby generating a gridded cross section which includes a grid having a plurality of intersection points, wherein each intersection point is not an area and is not a volume, and said plurality of scattered data observations distributed among the intersection points of said grid on said cross section;

(b) obtaining a unique cumulative distribution function associated with each intersection point of the grid of the gridded cross section using ordinary Kriging, thereby producing a plurality of cumulative distribution functions associated, respectively, with the plurality of intersection points of said grid;

(c) choosing a value representing a probability-related attribute from each of the cumulative distribution functions at each of the intersection points of the gridded cross section thereby producing a plurality of values associated, respectively, with the plurality of intersection points, and (d) assigning each value to its associated intersection point of the gridded cross section and assigning a unique color to said each value thereby generating a map illustrating said set of risk-related characteristics of said cross section through said earth formation.

2. The method of claim 1, wherein the obtaining step (b), for obtaining a unique cumulative distribution function associated with each intersection point of the gridded cross-section, comprises the steps of:

(b1) Kriging the gridded cross section thereby generating a plurality of expected values and a plurality of corresponding standard deviations associated, respectively, with the plurality of intersection points of the grid of the gridded cross section;

(b2) producing a probability density function associated with each expected value and each corresponding standard deviation generated from step (b1) thereby producing a plurality of probability density functions corresponding, respectively, to the plurality of intersection points of the grid of the gridded cross section; and (b3) producing a cumulative distribution function associated with each probability density function produced from step (b2) thereby producing a plurality of cumulative distribution functions corresponding, respectively, to the plurality of probability density functions which correspond, respectively, to the plurality of intersection points of the grid of the gridded cross section.

3. The method of claim 2, wherein the choosing step (c), for choosing a value from each of the cumulative distribution functions at each of the intersection points of the gridded cross section, comprises the steps of:

(c1) selecting a probability "(1–Pcu)" for each of the cumulative distribution functions to determine an associated cut-off. "Xp" from each of the cumulative distribution functions, the associated cut-offs "Xp's" to be used as the chosen values.

4. The method of claim 2, wherein the choosing step (c), for choosing a value from each of the cumulative distribution functions at each of the intersection points of the gridded cross section, comprises the steps of:

(c1) choosing a cutoff "Xp" for each of the cumulative distribution functions to determine an associated probability "(1–Pcu)" from each of the cumulative distribution functions, the associated probabilities "(1–Pcu's)" to be used as the chosen values.

5. The method of claim 2, wherein the choosing step (c), for choosing a value from each of the cumulative distribution functions at each of the intersection points of the gridded cross section, comprises the steps of:

(c1) choosing a lower limit from each of the cumulative distribution functions, the lower limits to be used as the chosen values.

6. The method of claim 2, wherein the choosing step (c), for choosing a value from each of the cumulative distribution functions at each of the intersection points of the gridded cross section, comprises the steps of:

(c1) choosing an upper limit from each of the cumulative distribution functions, the upper limits to be used as the chosen values.

7. The method of claim 2, wherein the choosing step (c), for choosing a value from each of the cumulative distribution functions at each of the intersection points of the gridded cross section, comprises the steps of:

(c1) choosing a spread from each of the cumulative distribution functions, the spreads to be used as the chosen values.

8. The method of claim 2, wherein the choosing step (c), for choosing a value from each of the cumulative distribution functions at each of the intersection points of the gridded cross section, comprises the steps of:

(c1) applying an affine correction to each of the values chosen from each of the cumulative distribution functions associated with each of the intersection points of the gridded cross section thereby choosing a plurality of corrected values corresponding, respectively, to the plurality of intersection points of the gridded cross section.

9. The method of claim 8, wherein the assigning step (d), for assigning each value to its associated intersection point of the gridded cross section and assigning a unique color to said each value thereby generating said map, comprises the steps of:

(d1) assigning each of said plurality of corrected values to its associated intersection point of the gridded cross section and assigning said unique color to each said corrected value thereby generating said map illustrating said set of risk-related characteristics of said cross section through said earth formation.

10. The method of claim 9, wherein said corrected value is a probability "(1−Pcu)".

11. The method of claim 9, wherein said corrected value is a cutoff "Xp".

12. The method of claim 9, wherein said corrected value is a lower limit.

13. The method of claim 9, wherein said corrected value is an upper limit.

14. The method of claim 9, wherein said corrected value is a spread.

15. A program storage device readable by a machine, tangibly embodying a program of instructions executable by the machine to perform method steps for generating a map illustrating a set of risk-related characteristics of a cross section through an earth, representing a time slice passing horizontally through the formation or a horizon passing generally horizontally through said formation, in response to a plurality of scattered data observations on said cross section representing a plurality of parameters located at a plurality of locations on said cross section, said method steps comprising the steps of:

(a) gridding said cross section thereby generating a gridded cross section which includes a grid having a plurality of intersection points and said plurality of scattered data observations distributed among the intersection points of said grid on said cross section;

(b) obtaining a unique cumulative distribution function associated with each intersection point of the grid of the gridded cross section using ordinary Kriging, thereby producing a plurality of cumulative distribution functions associated, respectively, with the plurality of intersection points of said grid;

(c) choosing a value representing a probability-related attribute from each of the cumulative distribution function at each of the intersection points of the gridded cross section thereby producing a plurality of values associated, respectively, with the plurality of intersection points, and (d) assigning each value to its associated intersection point of the gridded cross section and assigning a unique color to said each value thereby generating a map illustrating said set of risk-related characteristics of said cross section through said earth formation.

16. The program storage device of claim 15, wherein the obtaining step (b), for obtaining a unique cumulative distribution function associated with each intersection point of the gridded cross-section, comprises the steps of:

(b1) Kriging the gridded cross section thereby generating a plurality of expected values and a plurality of corresponding standard deviations associated, respectively, with the plurality of intersection points of the grid of the gridded cross section;

(b2) producing a probability density function associated with each expected value and each corresponding standard deviation generated from step (b1) thereby producing a plurality of probability density functions corresponding, respectively, to the plurality of intersection points of the grid of the gridded cross section; and (b3) producing a cumulative distribution function associated with each probability density function produced from step (b2) thereby producing a plurality of cumulative distribution functions corresponding, respectively, to the plurality of probability density functions which correspond, respectively, to the plurality of intersection points of the grid of the gridded cross section.

17. The program storage device of claim 16, wherein the choosing step (c), for choosing a value from each of the cumulative distribution functions at each of the intersection points of the gridded cross section, comprises the steps of:

(c1) choosing a probability "(1−Pcu)" for each of the cumulative distribution functions to determine the associated cut-off. "Xp" from each of the cumulative distribution functions, the associated the associated cut-offs "Xp's" to be used as the chosen values.

18. The program storage device of claim 16, wherein the choosing step (c), for choosing a value from each of the cumulative distribution functions at each of the intersection points of the gridded cross section, comprises the steps of:

(c1) choosing a cutoff "Xp" from each of the cumulative distribution functions to determine the associated probability "(1−Pcu)" from each of the cumulative distribution functions, the associated probabilities "(1−Pcu's)" to be used as the chosen values.

19. The program storage device of claim 16, wherein the choosing step (c), for choosing a value from each of the cumulative distribution functions at each of the intersection points of the gridded cross section, comprises the steps of:

(c1) choosing a lower limit from each of the cumulative distribution functions, the lower limits to be used as the chosen values.

20. The program storage device of claim 16, wherein the choosing step (c), for choosing a value from each of the cumulative distribution functions at each of the intersection points of the gridded cross section, comprises the steps of:

(c1) choosing an upper limit from each of the cumulative distribution functions, the upper limits to be used as the chosen values.

21. The program storage device of claim 16, wherein the choosing step (c), for choosing a value from each of the cumulative distribution functions at each of the intersection points of the gridded cross section, comprises the steps of:

(c1) choosing a spread from each of the cumulative distribution functions, the spreads to be used as the chosen values.

22. The program storage device of claim 16, wherein the choosing step (c), for choosing a value from each of the cumulative distribution functions at each of the intersection points of the gridded cross section, comprises the steps of:

(c1) applying an affine correction to each of the values chosen from each of the cumulative distribution functions associated with each of the intersection points of the gridded cross section thereby choosing a plurality of corrected values corresponding, respectively, to the plurality of intersection points of the gridded cross section.

23. The program storage device of claim 22, wherein the assigning step (d), for assigning each value to its associated intersection point of the gridded cross section and assigning a unique color to said each value thereby generating said map, comprises the steps of:

(d1) assigning each of said plurality of corrected values to its associated intersection point of the gridded cross section and assigning said unique color to each said corrected value thereby generating said map illustrating said set of risk-related characteristics of said cross section through said earth formation.

24. The program storage device of claim 23, wherein said corrected value is selected from a group consisting of: a probability "(1−Pcu)", a cutoff "Xp", a lower limit, an upper limit, and a spread.

25. An apparatus adapted for generating a risk-related map representing a cross section through an earth formation in response to a plurality of scattered observation data distributed throughout said cross section, said cross section representing a time slice passing horizontally through the formation or a horizon passing generally horizontally through said formation, comprising:

first apparatus adapted for gridding said cross section thereby generating a first gridded cross section which includes a plurality of intersection points and said plurality of scattered observation data distributed throughout said cross section;

second apparatus responsive to said first gridded cross section adapted for Kriging said first gridded cross section thereby generating a second gridded cross section having a plurality of intersection points wherein each intersection point of said second gridded cross section includes an expected value of a parameter and a standard deviation;

third apparatus responsive to said second gridded cross section for investigating properties of the plurality of scattered observation data distributed throughout said cross section by generating a plurality of cumulative distribution functions associated, respectively, with said plurality of intersection points of said second gridded cross section; and fourth apparatus adapted for selecting a plurality of values, representing a probability-related attributes, respectively, from said plurality of cumulative distribution functions and for assigning said plurality of values and a plurality of unique colors to the respective plurality of intersection points of said second gridded cross section thereby generating said map.

26. The apparatus of claim 25, wherein said third apparatus, for generating said plurality of cumulative distribution functions associated, respectively, with said plurality of intersection points of said second gridded cross section, comprises:

probability density function generation apparatus adapted for generating a plurality of probability density functions associated, respectively, with said plurality of intersection points of said second gridded cross section in response to the plurality of expected values and the plurality of standard deviations associated, respectively, with said plurality of intersection points of said second gridded cross section;

cumulative distribution function generation apparatus responsive to said plurality of probability density functions adapted for generating said plurality of cumulative distribution functions from said plurality of probability density functions which are associated, respectively, with said plurality of intersection points of said second gridded cross section.

27. The apparatus of claim 26, wherein each of said plurality of values selected, respectively, by said fourth apparatus from said plurality of cumulative distribution functions, is selected from a group consisting of: a probability "(1−Pcu)", a cutoff "Xp", a lower limit, an upper limit, and a spread.

28. The apparatus of claim 26, wherein said fourth apparatus, adapted for selecting said plurality of values, respectively, from said plurality of cumulative distribution functions and for assigning said plurality of values and said plurality of unique colors to the respective plurality of intersection points of said second gridded cross section, comprises:

correction apparatus adapted for applying an affine correction to each of said plurality of values selected, respectively, from said plurality of cumulative distribution functions thereby generating a plurality of corrected values corresponding, respectively, to said plurality of intersection points of said second gridded cross section; and assignment apparatus adapted for assigning said plurality of corrected values and a plurality of unique colors to the respective plurality of intersection points of said second gridded cross section thereby generating said map.

29. The apparatus of claim 28, wherein each of said plurality of corrected values generated by said correction apparatus is selected from a group consisting of: a corrected probability "(1−Pcu) [corrected]", a corrected cutoff "Xp (corrected)", a corrected lower limit "lower limit (corrected)", a corrected upper limit "upper limit (corrected)", and a corrected spread "spread (corrected)".

30. A method of generating a cube illustrating a set of risk-related characteristics of an earth formation disposed within a cubic volume of earth, said cube including a plurality of generally horizontal cross sections, each cross section including a plurality of scattered data samples, each cross section being gridded and including a plurality of intersection points, comprising the steps of:

(a) investigating properties of the plurality of scattered data samples by using ordinary Kriging and determining a plurality of cumulative distribution functions corresponding, respectively, to the plurality of intersection points for each of said plurality of cross sections;

(b) selecting a value representing a probability-related attribute from each of said cumulative distribution functions thereby selecting a plurality of values corresponding, respectively, to said plurality of cumulative distribution functions for each of said plurality of cross sections;

(c) assigning said plurality of values, respectively, to said plurality of intersection points for each of said plurality of cross sections; and (d) assigning a plurality of unique colors, respectively, to said plurality of values assigned, respectively, to said plurality of intersection points.

31. The method of claim 30, wherein the assigning step (c) comprises the steps of:
(c1) correcting each of the values selected from said cumulative distribution functions during the selecting step (b) thereby generating a plurality of corrected values; and
(c2) assigning said plurality of corrected values, respectively, to said plurality of intersection points for each of said plurality of cross sections.

32. The method of claim 31, wherein the assigning step (d) comprises the steps of:
(d1) assigning a plurality of unique colors, respectively, to said plurality of corrected values assigned, respectively, to said plurality of intersection points.

33. The method of claim 30, wherein the determining step (a), for determining a plurality of cumulative distribution functions, comprises the steps of:
(a1) determining a plurality of expected values and a plurality of standard deviations corresponding, respectively, to the plurality of intersection points for each of said plurality of cross sections, an expected value and a standard deviation being associated with each intersection point;
(a2) determining a plurality of probability density functions corresponding, respectively, to said plurality of expected values and said plurality of standard deviations for each of said plurality of cross sections, a probability density function being associated with each intersection point; and
(a3) determining a plurality of cumulative distribution functions corresponding, respectively, to said plurality of probability density functions for each of said plurality of cross sections.

34. The method of claim 33, wherein each of the values, selected from each of said cumulative distribution functions during the selecting step (b), is selected from a group consisting of: a probability "(1−Pcu)", a cutoff "Xp", a lower limit, an upper limit, and a spread.

35. The method of claim 34, wherein the plurality of corrected values generated during the correcting step (c1) is selected from a group consisting of: a corrected probability "(1−Pcu) [corrected]", a corrected cutoff "Xp(corrected)", a corrected lower limit "lower limit (corrected)", a corrected upper limit "upper limit (corrected)", and a corrected spread "spread (corrected)".

36. A program storage device readable by a machine, tangibly embodying a program of instructions executable by the machine to perform method steps for generating a cube illustrating a set of risk-related characteristics of an earth formation disposed within a cubic volume of earth, said cube including a plurality of cross sections, each cross section including a plurality of scattered data samples, each cross section being gridded and including a plurality of intersection points, said method steps comprising the steps of:
(a) investigating properties of the plurality of scattered data samples by using ordinary Kriging and determining a plurality of cumulative distribution functions corresponding, respectively, to the plurality of intersection points for each of said plurality of cross sections;
(b) selecting a value representing a probability-related attribute from each of said cumulative distribution functions thereby selecting a plurality of values corresponding, respectively, to said plurality of cumulative distribution functions for each of said plurality of cross sections;
(c) assigning said plurality of values, respectively, to said plurality of intersection points for each of said plurality of cross sections; and
(d) assigning a plurality of unique colors, respectively, to said plurality of values assigned, respectively, to said plurality of intersection points.

37. The program storage device of claim 36, wherein the assigning step (c) comprises the steps of:
(c1) correcting each of the values selected from said cumulative distribution functions during the selecting step (b) thereby generating a plurality of corrected values; and
(c2) assigning said plurality of corrected values, respectively, to said plurality of intersection points for each of said plurality of cross sections.

38. The program storage device of claim 37, wherein the assigning step (d) comprises the steps of:
(d1) assigning a plurality of unique colors, respectively, to said plurality of corrected values assigned, respectively, to said plurality of intersection points.

39. The program storage device of claim 38, wherein the determining step (a), for determining a plurality of cumulative distribution functions, comprises the steps of:
(a1) determining a plurality of expected values and a plurality of standard deviations corresponding, respectively, to the plurality of intersection points for each of said plurality of cross sections, an expected value and a standard deviation being associated with each intersection point;
(a2) determining a plurality of probability density functions corresponding, respectively, to said plurality of expected values and said plurality of standard deviations for each of said plurality of cross sections, a probability density function being associated with each intersection point; and
(a3) determining a plurality of cumulative distribution functions corresponding, respectively, to said plurality of probability density functions for each of said plurality of cross sections.

40. The program storage device of claim 39, wherein each of the values, selected from each of said cumulative distribution functions during the selecting step (b), is selected from a group consisting of: a probability "(1−Pcu)", a cutoff "Xp", a lower limit, an upper limit, and a spread.

41. The program storage device of claim 40, wherein the plurality of corrected values generated during the correcting step (c1) is selected from a group consisting of: a corrected probability "(1−Pcu) [corrected]", a corrected cutoff "Xp (corrected)", a corrected lower limit "lower limit (corrected)", a corrected upper limit "upper limit (corrected)", and a corrected spread "spread (corrected)".

42. The apparatus of claim 25, wherein fourth apparatus adapted for selecting a plurality of values is adapted to chose a probability "(1−Pcu)" for each of the cumulative distribution functions to be used to determine an associated cut-off. "Xp" from each of the cumulative distribution functions, the associated cut-offs "Xp's" to be used as the selected values.

43. The apparatus of claim 25, wherein the fourth apparatus adapted for selecting a plurality of values is adapted to choose a cutoff "Xp" for each of the cummulative distribution functions, to be used determine an associated probability "(1−Pcu)" from each of the cumulative distribution functions, the associated probabilities "(1−Pcu's)" to be used as the selected values.

44. The apparatus of claim 25, wherein the fourth apparatus adapted for selecting a plurality of values is adapted to select a lower limit from each of the cumulative distribution functions, the lower limits to be used as the selected values.

45. The apparatus of claim 25, wherein the fourth apparatus adapted for selecting a plurality of values is adapted to select an upper limit from each of the cumulative distribution functions, the upper limits to be used as the selected values.

46. The apparatus of claim 25, wherein the fourth apparatus adapted for selecting a plurality of values is adapted to select a spread from each of the cumulative distribution functions, the spreads to be used as the selected values.

47. The method of claim 30, wherein the selecting step (b), for selecting a value representing a probability-related attribute from each of said cumulative distribution functions comprises the steps of:

(b1) choosing a probability "(1−Pcu)" for each of the cumulative distribution functions to determine an associated cut-off. "Xp" from each of the cumulative distribution functions, the associated cut-offs "Xp's" to be used as the selected values.

48. The method of claim 30, wherein the selecting step (b), for selecting a value representing a probability-related attribute from each of said cumulative distribution functions comprises the steps of:

(b1) choosing a cutoff "Xp" for each of the cumulative distribution functions to determine an associated probability "(1−Pcu)" from each of the cumulative distribution functions, the associated probabilities "(1−Pcu's)" to be used as the selected values.

49. The method of claim 30, wherein the selecting step (b), for selecting a value representing a probability-related attribute from each of said cumulative distribution functions comprises the step of choosing a lower limit from each of the cumulative distribution functions, the lower limits to be used as the selected values.

50. The method of claim 30, wherein the selecting step (b), for selecting a value representing a probability-related attribute from each of said cumulative distribution functions comprises the step of choosing an upper limit from each of the cumulative distribution functions, the upper limits to be used as the selected values.

51. The method of claim 30, wherein the selecting step (b), for selecting a value representing a probability-related attribute from each of said cumulative distribution functions comprises the step of choosing a spread from each of the cumulative distribution functions, the spreads to be used as the selected values.

52. The program storage device of claim 36, wherein step of (b) selecting a value representing a probability-related attribute from each of said cumulative distribution functions comprises the steps of choosing a probability "(1−Pcu)" for each of the cumulative distribution functions, and using the probability for each of the cumulative distribution functions to determine an associated cut-off. "Xp" from each of the cumulative distribution functions, the associated cut-offs "Xp's" to be used as the selected values.

53. The program storage device of claim 36, wherein step of (b) selecting a value representing a probability-related attribute from each of said cumulative distribution functions comprises the steps of choosing a cutoff "Xp" for each of the cumulative distribution functions, and using the cutoff "Xp" for each of the cumulative distribution functions to determine an associated probability "(1−Pcu)" from each of the cumulative distribution functions, the associated probabilities "(1−Pcu's)" to be used as the selected values.

54. The program storage device of claim 36, wherein step of (b) selecting a value representing a probability-related attribute from each of said cumulative distribution functions comprises the step of selecting a lower limit from each of the cumulative distribution functions, the lower limits to be used as the selected values.

55. The program storage device of claim 36, wherein step of (b) selecting a value representing a probability-related attribute from each of said cumulative distribution functions comprises the step of selecting an upper limit from each of the cumulative distribution functions, the upper limits to be used as the selected values.

56. The program storage device of claim 36, wherein step of (b) selecting a value representing a probability-related attribute from each of said cumulative distribution functions comprises the step of selecting a spread from each of the cumulative distribution functions, the spreads to be used as the selected values.

* * * * *